(12) United States Patent
Kibayashi et al.

(10) Patent No.: US 12,038,112 B2
(45) Date of Patent: Jul. 16, 2024

(54) PROTECTIVE FRAME ARTICULATED BODY AND SUSPENDING DEVICE

(71) Applicant: Mitsubishi Electric Corporation, Tokyo (JP)

(72) Inventors: Yusuke Kibayashi, Tokyo (JP); Noboru Kawaguchi, Tokyo (JP); Junji Takaki, Tokyo (JP); Katsumi Yamasaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 17/774,479

(22) PCT Filed: Nov. 10, 2020

(86) PCT No.: PCT/JP2020/041875
§ 371 (c)(1),
(2) Date: May 5, 2022

(87) PCT Pub. No.: WO2021/095715
PCT Pub. Date: May 20, 2021

(65) Prior Publication Data
US 2022/0390039 A1    Dec. 8, 2022

(30) Foreign Application Priority Data
Nov. 12, 2019 (JP) ................. 2019-204371

(51) Int. Cl.
*F16L 3/015*    (2006.01)
*F16G 13/16*    (2006.01)
*F16M 11/40*    (2006.01)

(52) U.S. Cl.
CPC .............. *F16L 3/015* (2013.01); *F16G 13/16* (2013.01); *F16M 11/40* (2013.01)

(58) Field of Classification Search
CPC .......... F16L 3/015; F16L 13/16; F16M 11/40; F16G 13/16; F16F 15/08; F16F 2224/02; H02G 11/006
See application file for complete search history.

(56) References Cited

U.S. PATENT DOCUMENTS

| 6,481,195 B1 * | 11/2002 | Blase .................. H02G 11/006 248/51 |
| 8,575,486 B2 | 11/2013 | Jaeker et al. |
| 2019/0195316 A1 | 6/2019 | Moritz et al. |

FOREIGN PATENT DOCUMENTS

| CN | 205578619 U | 9/2016 |
| JP | 2002-512347 A | 4/2002 |

(Continued)

OTHER PUBLICATIONS

International Search Report and Written Opinion dated Dec. 15, 2020, received for PCT Application PCT/JP2020/041875, Filed on Nov. 10, 2020, 10 pages including English Translation.

(Continued)

*Primary Examiner* — Nkeisha Smith
(74) *Attorney, Agent, or Firm* — XSENSUS LLP

(57) ABSTRACT

In a protective frame articulated body, a range of an connection angle between the protective frame body and the adjacent protective frame body is determined such that a plurality of protective frame bodies, being connected in series, through which a body to be protected is passed becomes a shape having a first bent portion, an intermediate linear portion being in a portion closer to a movable-side connection than the first bent portion, a suspending portion hanging from the movable-side connection, and a second bent portion connecting the intermediate linear portion and the suspending portion. In intermediate linear portion, a long-and-short ratio being a value obtained by dividing a long side of a smallest rectangle surrounding the protective (Continued)

frame body viewed from a side by a short side of the smallest rectangle is greater than or equal to a determined intermediate minimum long-and-short ratio.

28 Claims, 16 Drawing Sheets

(56) References Cited

FOREIGN PATENT DOCUMENTS

| | | |
|---|---|---|
| JP | 2018-189748 A | 11/2018 |
| JP | 2019-529820 A | 10/2019 |

OTHER PUBLICATIONS

Notice of Reasons for Refusal dated Jun. 8, 2021, received for JP Application 2021-506600, 10 pages including English Translation.
Decision to Grant dated Sep. 21, 2021, received for JP Application 2021-506600, 5 pages including English Translation.

\* cited by examiner

PROTECTIVE FRAME ARTICULATED BODY AND SUSPENDING DEVICE

CROSS-REFERENCE TO RELATED APPLICATIONS

The present application is based on PCT filing PCT/JP2020/041875, filed Nov. 10, 2020, which claims priority to JP 2019-204371, filed Nov. 12, 2019, the entire contents of each are incorporated herein by reference.

TECHNICAL FIELD

The present disclosure is a protective frame articulated body that protects and holds flexibly a bendable cable or pipe in which one end is connected to a fixed-side member while the other end is connected to a movable-side member moving above the fixed-side member, and a suspending device that suspends the protective frame articulated body.

BACKGROUND ART

A cable or a pipe transmitting energy or information between the movable-side member and the fixed-side member is used in a large structure, having a movable-side member, such as a telescope and an antenna. The cable or the pipe is attached to a cable guide so as not to get entangled. In the cable guide (protective frame articulated body), a protective frame body that is of a frame body, in which a frame through which the cable or the pipe is passed individually is combined, is articulated in a cable extending direction. There has been a support device in which when the movable-side member moves in a horizontal plane, the cable guide is bent in a middle such that two portions of the cable guide exist up and down and the upper portion of cable guide is supported by a plurality of supports having roller portions (see PTL 1). Positions of the plurality of supports do not move, the roller portion rolls according to the movement of the cable guide, and the support supports the different position of the cable guide. This mechanism prevents deflection of the cable guide, and enables an increase in a size of the cable guide. Furthermore, when a bent portion that is a portion connecting the upper and lower cable guides moves, the support is pushed by the bent portion, and the support retracts.

When the movable-side member moves in a vertical direction and the horizontal direction in a space above the fixed-side member, the position where the cable guide exists cannot be limited to a horizontal plane having a determined height. For this reason, the cable guide cannot be supported from below, but the cable guide is required to be suspended from above.

There has been proposed use of reaction force of a magnet in order that the cable guide in which one end moves does not come into contact with another object (see PTL 2).

CITATION LIST

Patent Literature

PTL 1: U.S. Pat. No. 8,575,486B2
PTL 2: Japanese Patent Laying-Open No. 2018-189748

SUMMARY OF INVENTION

Technical Problem

When the cable guide is light, the cable guide can be prevented from coming into contact with other objects using the magnet. The cable guide weighing at least several kilograms cannot be supported by the reaction force of the magnet.

When the space where the cable guide can be installed is limited, the suspending device that suspends a plurality of cable guides is required to be able to dispose the plurality of cable guides (protective frame articulated bodies) close to each other such that many cables or pipes can pass through the small space. Even when the movable-side member moves, there is a demand for a protective frame articulated body having a shape that allows the protective frame articulated body to be disposed close to another protective frame articulated body without coming into contact with another protective frame articulated body.

Solution to Problem

According to one aspect of the present disclosure, a protective frame articulated body includes: a protective frame body portion including a plurality of protective frame bodies, being connected in series, through which a body to be protected, being a bendable cable or tube is passed, each of the plurality of protective frame bodies having a determined length in an extending direction in which the body to be protected extends, including a connection connected to an adjacent protective frame body, and a connection angle limiter limiting a connection angle with the adjacent protective frame body in the connection within a determined connection angle range; a fixed-side connection to connect one end of the protective frame body portion to a fixed-side member; and a movable-side connection to connect the other end of the protective frame body portion rotatably to the movable-side member that moves relative to the fixed-side member above the fixed-side member and suspends the protective frame body portion.

The protective frame body portion includes a first surface that is one surface in two surfaces and a second surface that is the other surface in the two surfaces, the two surfaces being concave or convex depending on the connection angle. The connection angle range of the protective frame body is determined such that the protective frame body portion becomes a shape having a first bent portion that includes a part of the plurality of protective frame bodies connected while the second surface is bent to be concave, an intermediate linear portion that includes a part of the plurality of protective frame bodies connected in a straight line or a polygonal line when viewed from a side in a portion closer to the movable-side connection than the first bent portion, a suspending portion that is the protective frame body hanging downward from the movable-side member, and a second bent portion that is the protective frame body that connects the intermediate linear portion and the suspending portion while the first surface is bent to be concave. The intermediate linear portion having a long-and-short ratio that is greater than or equal to an intermediate minimum long-and-short ratio. The long-and-short ratio is a value obtained by dividing a long side of a smallest rectangle surrounding the plurality of protective frame bodies viewed from the side is divided by a short side of the smallest rectangle. Some of the plurality of protective frame bodies belongs to the first bent portion or the intermediate linear portion depending on a movement of the movable-side member. In each position where the movable-side member moves, each of the plurality of protective frame bodies does not contact other protective frame bodies except for the protective frame body connected thereto at the connection.

Advantageous Effects of Invention

According to the present disclosure, the protective frame articulated body having the shape that allows the protective frame articulated body to be disposed close to another protective frame articulated body without coming into contact with another protective frame articulated bodies even when the movable-side member moves is obtained.

DESCRIPTION OF EMBODIMENTS

Embodiment 1

Figure 1:
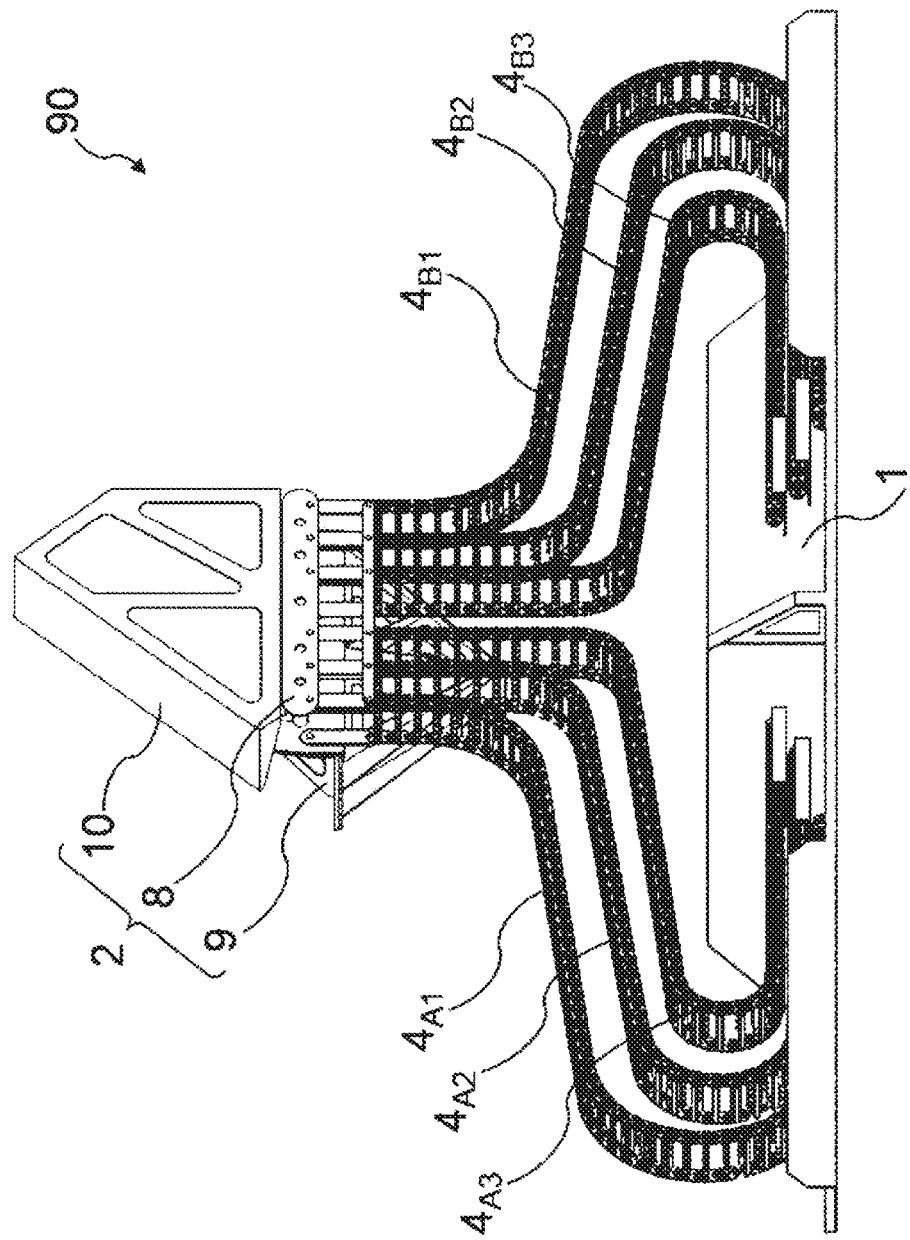
FIG. 1 is a perspective view illustrating a structure of a suspending device according to Embodiment 1 viewing from diagonally front left.
Figure 2:
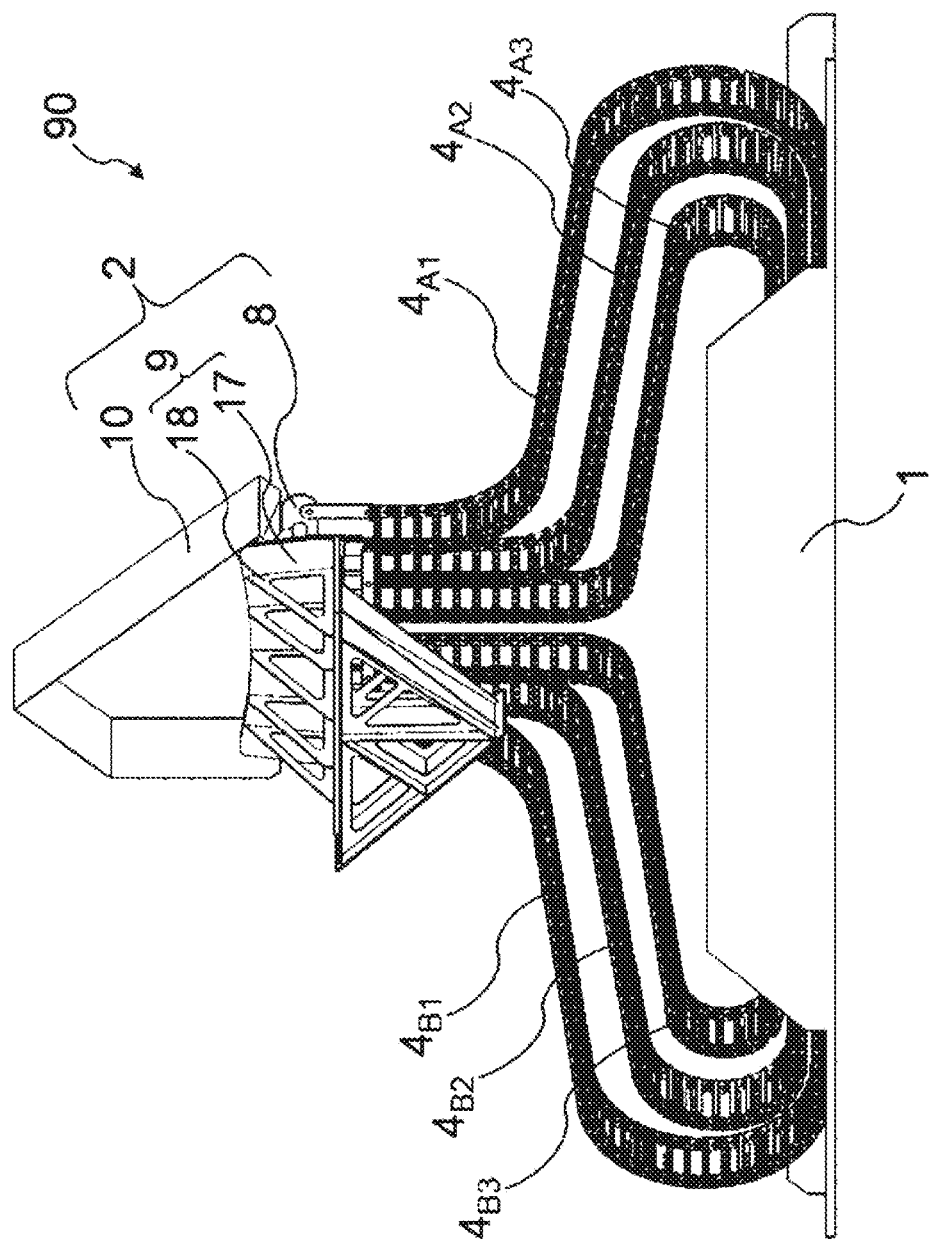
FIG. 2 is a perspective view illustrating the structure of the suspending device of Embodiment 1 viewing from diagonally rear left.
Figure 9:
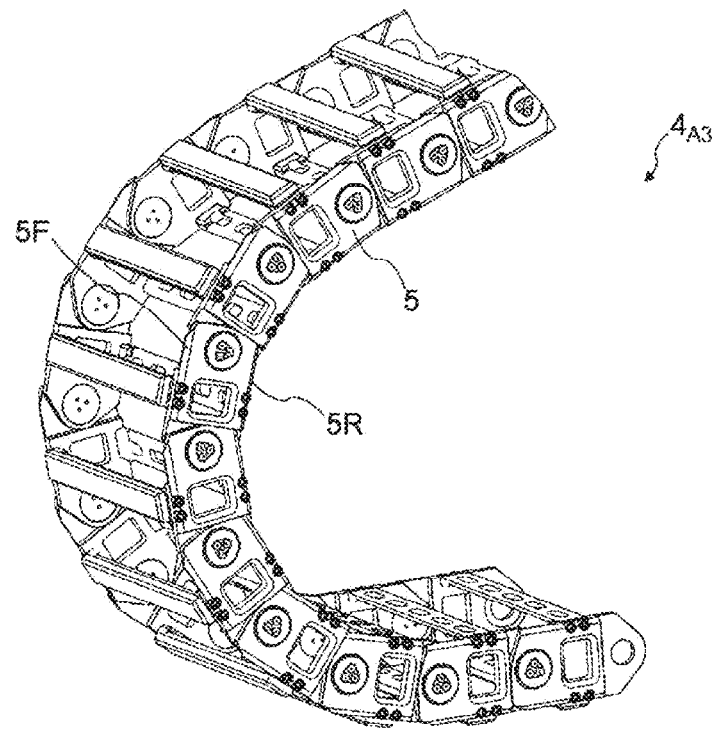
FIG. 9 is a perspective view illustrating a structure of a cable guide included in the suspending device of Embodiment 1.
Figure 10:
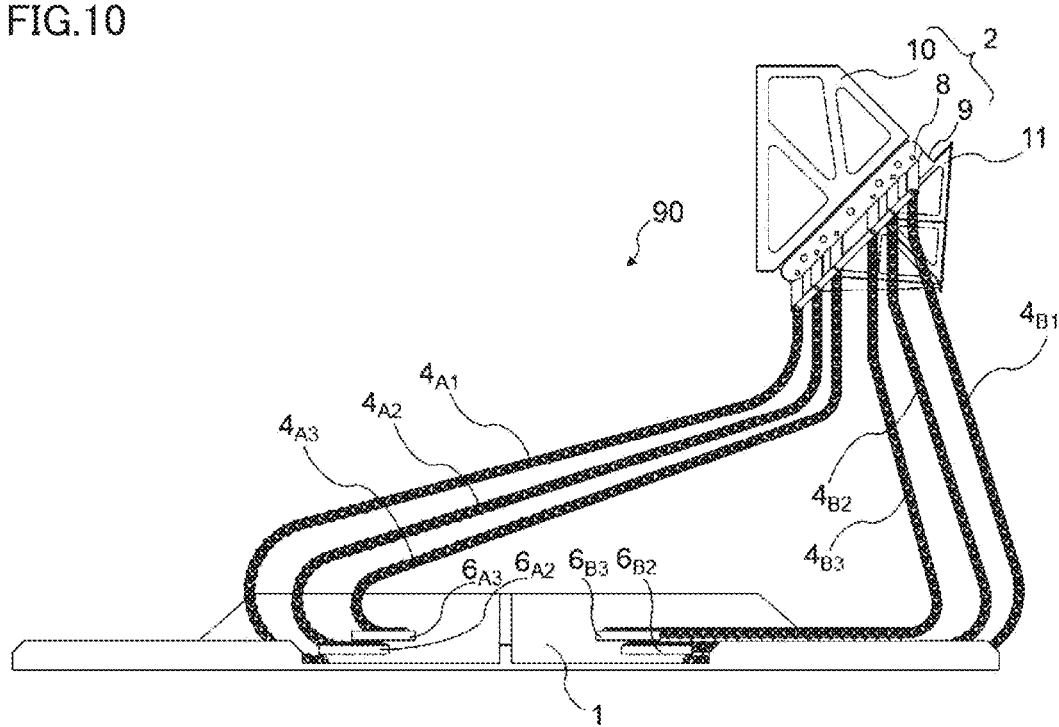
FIG. 10 is a front view illustrating the structure of the suspending device of Embodiment 1 in another state.
Figure 11:
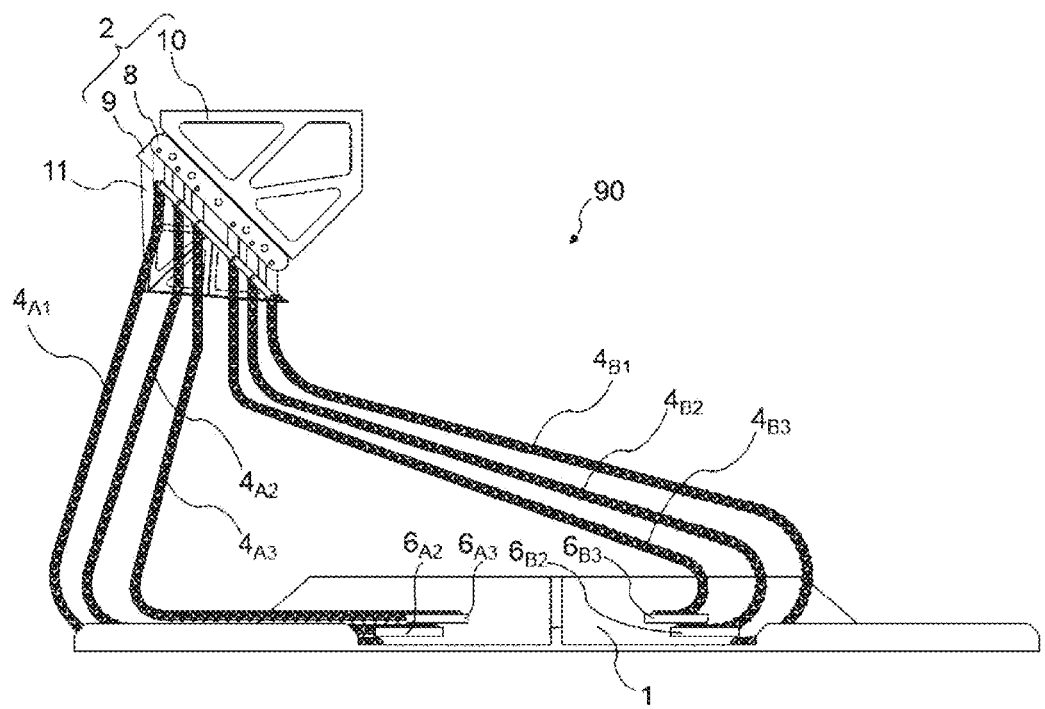
FIG. 11 is a front view illustrating the structure of the suspending device of the embodiment 1 in still another state.
Figure 12:
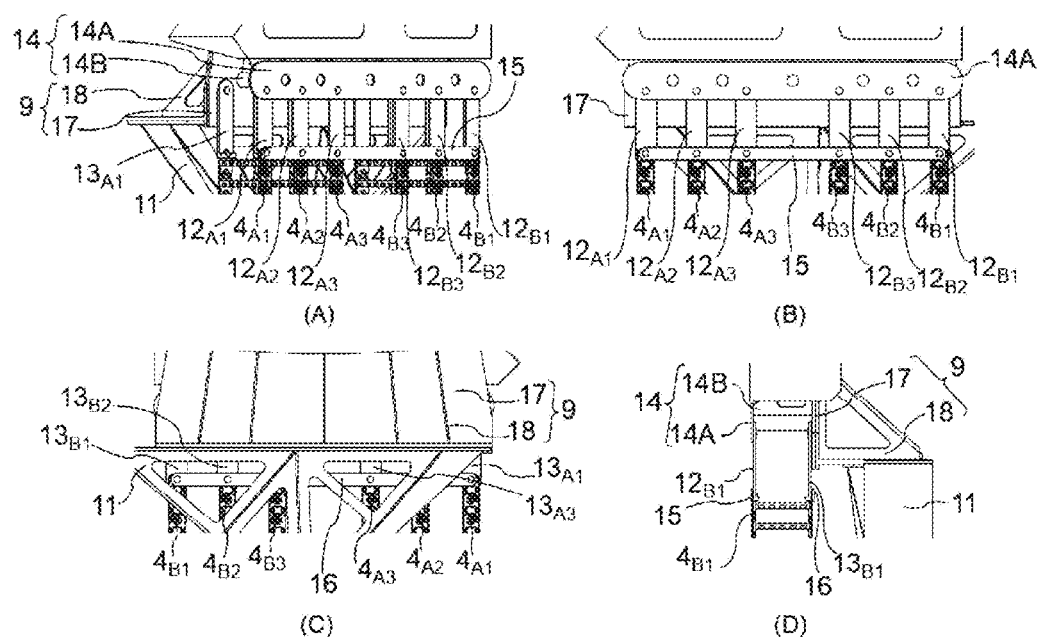
FIG. 12 is an enlarged view illustrating a place where the cable guide included in the suspending device of Embodiment 1 is connected to a movable-side member.
Figure 13:
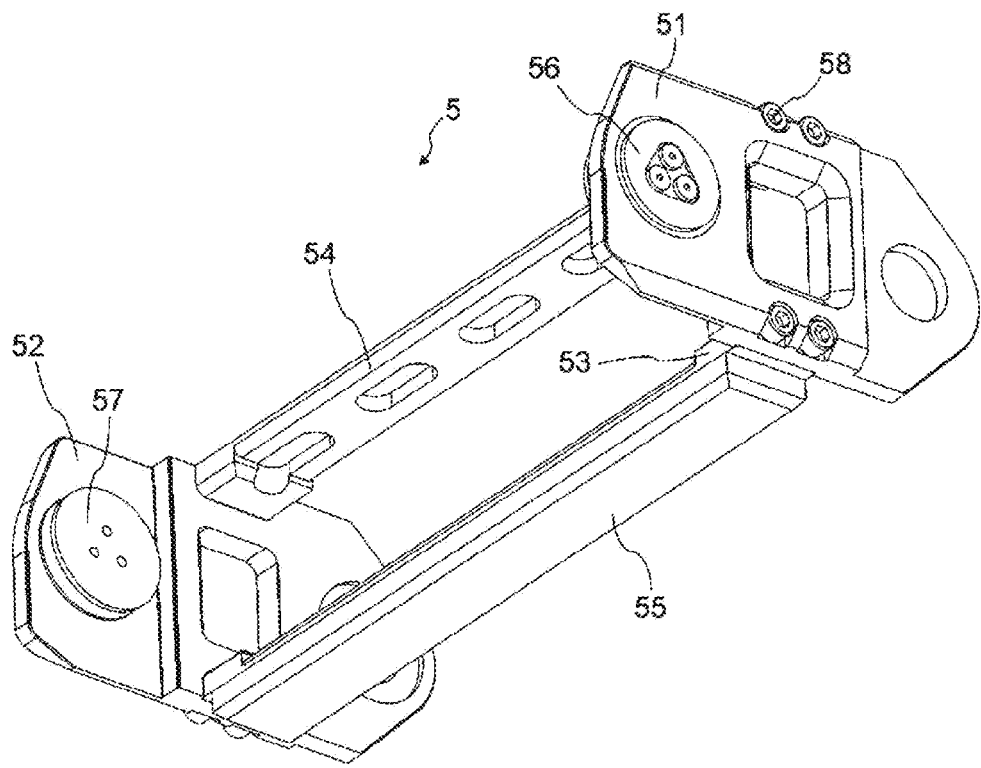
FIG. 13 is a perspective view illustrating the structure of a link included in the suspending device of Embodiment 1.

Referring to FIGS. 1 to 19, a structure of a suspending device 90 according to Embodiment 1 is described. Suspending device 90 is a device that suspends a plurality of cable guides 4 connecting a fixed-side member 1 and a movable-side member 2. FIGS. 1 and 2 are perspective views of suspending device 90. FIG. 1 is the perspective view illustrating suspending device 90 viewing from diagonally front left. FIG. 2 is the perspective view illustrating suspending device 90 as viewed from diagonally rear left. FIGS. 3 to 8 are a front view, a right side view, a rear view, a left side view, a plan view, and a bottom view of suspending device 90. FIG. 9 is a perspective view illustrating the structure of cable guide 4 included in suspending device 90. FIGS. 1 to 9 illustrate a state in which movable-side member 2 is located at a center of a movable range of movable-side member 2. FIGS. 10 and 11 are front views illustrating the structure of suspending device 90 in other states. FIG. 12 is an enlarged view illustrating a place where cable guide 4 included in suspending device 90 is connected to movable-side member 2. FIGS. 13 to 19 are a perspective view, a front view, a right side view, a rear view, a left side view, a plan view, and a bottom view illustrating the structure of link 5 constructing cable guide 4.

Suspending device 90 is mainly constructed of fixed-side member 1, movable-side member 2, and a plurality of cable guides 4. Cable guide 4 is a member that bundles and protects the plurality of cables and pipes. In the drawings, a state in which cable 3 (not illustrated) is not attached to cable guide 4 is illustrated. Suspending device 90 includes six cable guides 4. Cable guide 4 is used as a sign to represent all cable guides 4 or specific cable guide 4 is not designated. When specific cable guide 4 is referred to, cable guide 4 is written as a cable guide $4_{A1}$ or the like. The same applies to cable 3 and the like.

Fixed-side member 1 is fixed to a structure. Movable-side member 2 is movable relative to fixed-side member 1. Movable-side member 2 is fixed to the structure that can be moved relative to the structure to which fixed-side member 1 is fixed. Movable-side member 2 moves along an arc above fixed-side member 1. FIG. 10 illustrates the state in which movable-side member 2 has moved to the upper right side. FIG. 11 illustrates the state in which movable-side member 2 has moved to the upper left side. The structure to which fixed-side member 1 is fixed may be fixed to the ground or be movable.

Figure 3:
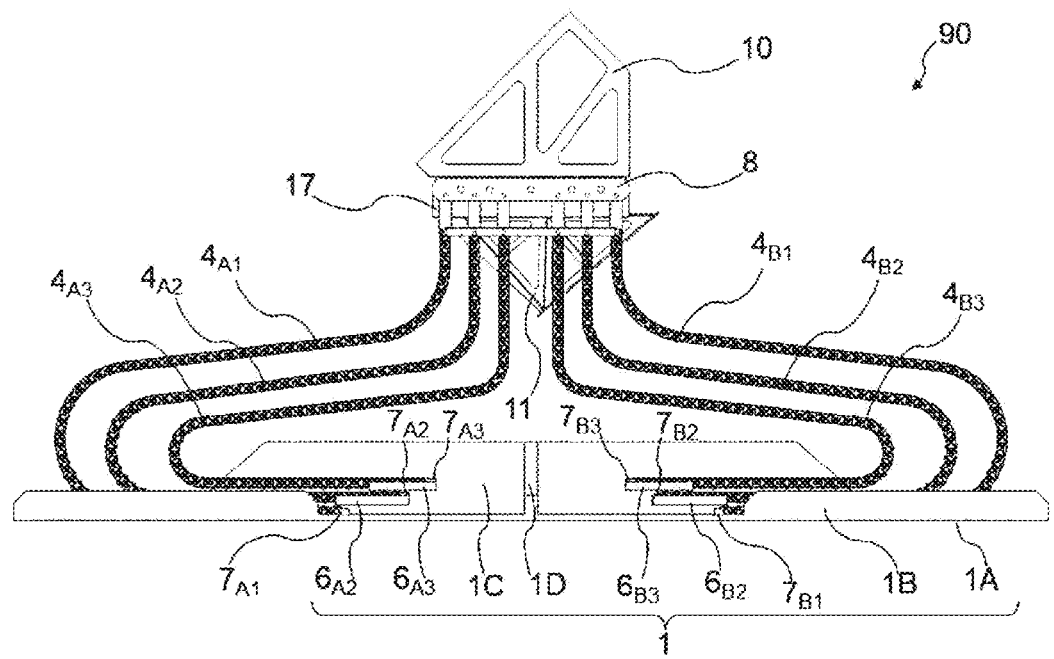
FIG. 3 is a front view illustrating the structure of the suspending device of Embodiment 1.
Figure 4:
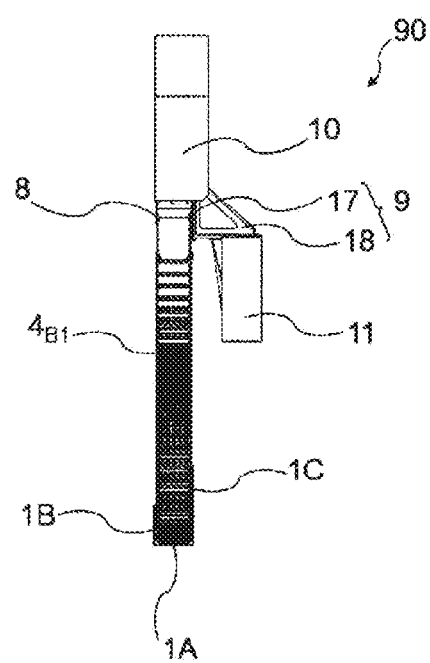
FIG. 4 is a right side view illustrating the structure of the suspending device of Embodiment 1.
Figure 5:
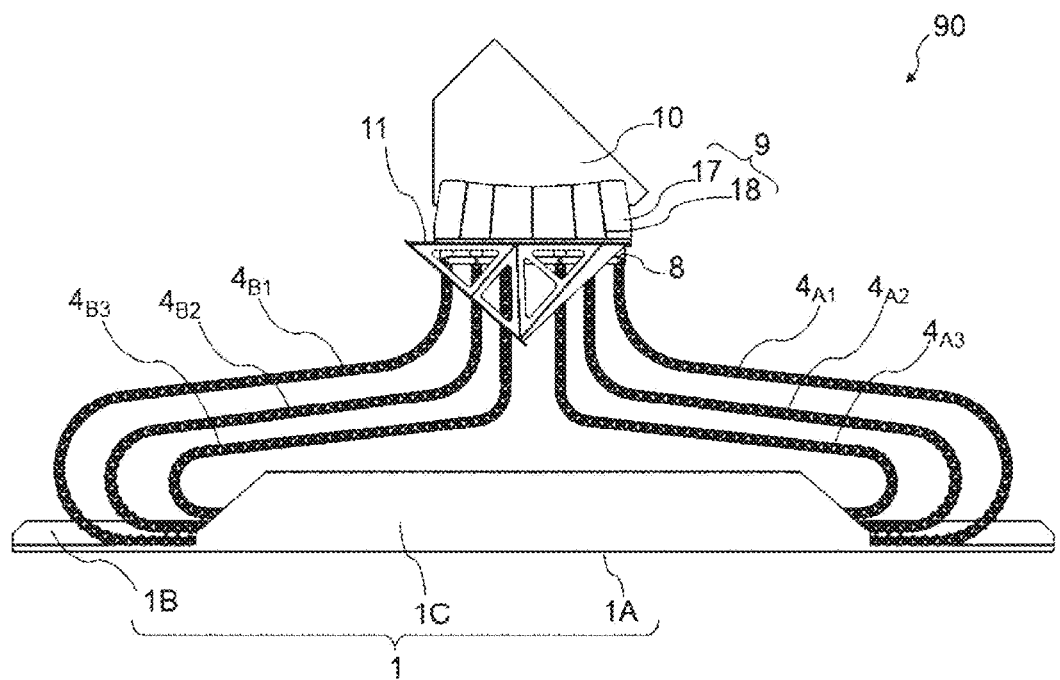
FIG. 5 is a rear view illustrating the structure of the suspending device of Embodiment 1.
Figure 6:
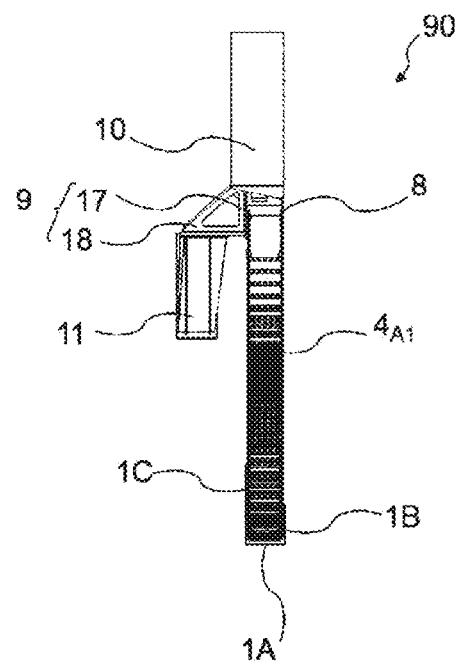
FIG. 6 is a left side view illustrating the structure of the suspending device of Embodiment 1.
Figure 7:
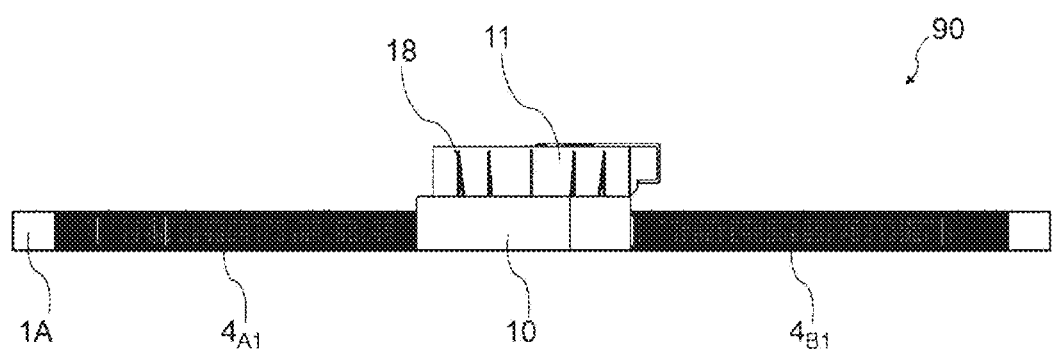
FIG. 7 is a plan view illustrating the structure of the suspending device of Embodiment 1.
Figure 8:
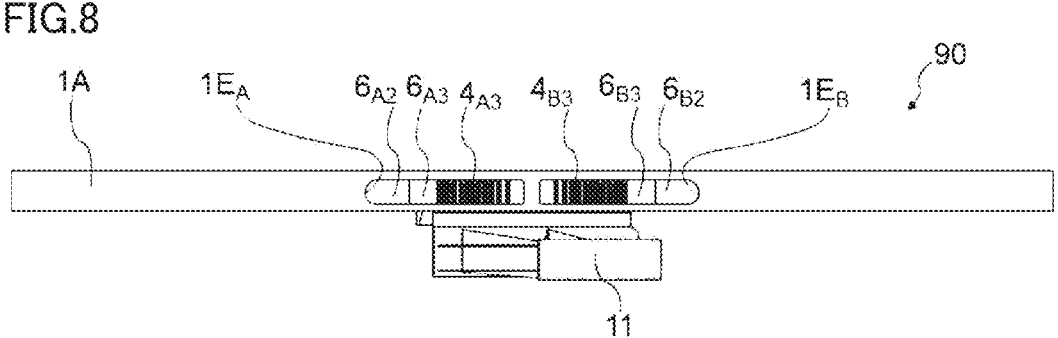
FIG. 8 is a bottom view illustrating the structure of the suspending device of Embodiment 1.

Suspending device 90 includes six cable guides $4_{A1}$, $4_{A2}$, $4_{A3}$, $4_{B1}$, $4_{B2}$, $4_{B3}$ suspended from movable-side member 2. In FIG. 3, cable guides $4_{A1}$, $4_{A2}$, $4_{A3}$ extend from fixed-side member 1 to a left side in the drawing, return to a central side, and are connected to movable-side member 2. Cable guides $4_{A1}$, $4_{A2}$, $4_{A3}$ are named in order from the leftmost side. Cable guides $4_{A1}$, $4_{A2}$, $4_{A3}$ extend to the left side, bend upward, extend in a straight line diagonally upward on the central side, and bend upward under movable-side member 2. In FIG. 3, cable guides $4_{B1}$, $4_{B2}$, $4_{B3}$ extend from fixed-side member 1 to the right side, return to the central side, and are connected to movable-side member 2. Cable guides $4_{B1}$, $4_{B2}$, $4_{B3}$ are named in order from the rightmost side. Cable guides $4_{B1}$, $4_{B2}$, $4_{B3}$ extend to the right, bend upward, extend in the straight line diagonally upward on the central side, and bend upward under movable-side member 2. As a result, cable guides $4_{A1}$, $4_{B1}$ are present on the lowermost side in the portion close to fixed-side member 1, and are present on the uppermost side or the outermost side in the portion close to movable-side member 2. Cable guides $4_{A3}$, $4_{B3}$ are present on the uppermost side in the portion close to fixed-side member 1, and are present on the lowermost side or the central side in the portion close to movable-side member 2. Cable guide $4_{A2}$ is present between cable guides $4_{A1}$, $4_{A3}$. Cable guide $4_{B2}$ is present between cable guides $4_{B1}$, $4_{B3}$. As illustrated in FIGS. 3, 10, and 11, even when movable-side member 2 moves, in suspending device 90, each of six cable guides $4_{A1}$, $4_{A2}$, $4_{A3}$, $4_{B1}$, $4_{B2}$, $4_{B3}$ can be disposed close to each other without contacting with another cable guide 4.

A plurality of links 5 are connected in series to constitute cable guide 4. For example, one link 5 has a width of about 1 m, a height of about 30 cm, and a length in the extending direction about 30 cm. Link 5 contains a plurality of cables 3 in a space having a cross section of the width of about 1 m and the height of about 30 cm. A plurality of links are connected in series in the extending direction that is the direction in which cable 3 extends. For example, cable guide 4 has the length of about 20 m by connecting about 70 to about 80 links 5.

Cable 3 carries power or an electric signal. Instead of the cable, a pipe filled with oil of a hydraulic mechanism may be contained in cable guide 4. The plurality of cables 3 are contained and protected in one of the plurality of cable guides $4_{A1}$, $4_{A2}$, $4_{A3}$, $4_{B1}$, $4_{B2}$, $4_{B3}$. A set of the cable protected by each of cable guide $4_{A1}$, $4_{A2}$, $4_{A3}$, $4_{B1}$, $4_{B2}$, $4_{B3}$ is referred to as cable $3_{A1}$, $3_{A2}$, $3_{A3}$, $3_{B1}$, $3_{B2}$, $3_{B3}$. Cables $3_{A3}$, $3_{B3}$ contained in cable guides $4_{A3}$, $4_{B3}$ disposed on the most central side are determined to be cables that can be bent with a large curvature. Each of cables $3_{A1}$, $3_{A2}$, $3_{A3}$, $3_{B1}$, $3_{B2}$, $3_{B3}$ is a body to be protected that is the cable or tube protected by each of cable guides $4_{A1}$, $4_{A2}$, $4_{A3}$, $4_{B1}$, $4_{B2}$, $4_{B3}$. Link 5 is a protective frame body through which the body to be protected passes and that protects the body to be protected. Cable guide 4 is a protective frame articulated body in which the protective frame bodies are connected in series. All links 5 included in cable guide 4 are a protective frame body portion included in cable guide 4.

Fixed-side member 1 has a shape in which side surfaces are provided on both sides of a bottom portion having a horizontally long rectangular shape. Fixed-side member 1 is fabricated by bending a steel plate. Fixed-side member 1 includes a bottom surface 1A, a front plate 1B, a rear plate 1C, a central support 1D, and a cable guide mounting portion $6_{A2}$, $6_{A3}$, $6_{B2}$, $6_{B3}$. In FIG. 1, a near side of cable guide 4 is defined as a front face of suspending device 90, and a far side is defined as a rear face of suspending device 90. The front face is also called a face or a front. The rear face is also called a back face or a back. The shape of fixed-side member 1 may be changed. Bottom surface 1A of fixed-side member 1 is fixed to the structure.

Bottom surface 1A has a horizontally long rectangular shape. Bottom surface 1A has the width slightly wider than the width of cable guide 4, and has the length on which cable guides $4_{A1}$, $4_{B1}$ can be mounted.

Two cable introduction holes $1E_A$, $1E_B$ are provided in the center of bottom surface 1A. Cables $3_{A1}$, $3_{A2}$, $3_{A3}$ are introduced into suspending device 90 through cable introduction hole $1E_A$. Cable $3_{A1}$, $3_{A2}$, $3_{A3}$ are attached to cable guide $4_{A1}$, $4_{A2}$, $4_{A3}$, respectively. Cables $3_{B1}$, $3_{B2}$, $3_{B3}$ are introduced into suspending device 90 through cable introduction hole $1E_B$. Cable $3_{B1}$, $3_{B2}$, $3_{B3}$ are attached to cable guide $4_{B1}$, $4_{B2}$, $4_{B3}$, respectively. The shapes of cable introduction holes $1E_A$, $1E_B$ are a rectangle in which a side far from the center is replaced with a semicircle. Cable introduction hole $1E_A$ is provided with a sufficient length such that cables $3_{A1}$, $3_{A2}$, $3_{A3}$ can be passed through. Cable introduction hole $1E_B$ is provided with a sufficient length such that cables $3_{B1}$, $3_{B2}$, $3_{B3}$ can be passed through.

Cable guide $4_{A1}$ is mounted on bottom surface 1A on the left side in FIG. 3 of cable introduction hole $1E_A$. The end of cable guide $4_{A1}$ is connected to bottom surface 1A by a cable guide connection $7_{A1}$. Cable guide $4_{B1}$ is mounted on bottom surface 1A on the right side in FIG. 3 of cable introduction hole $1E_B$. The end of cable guide $4_{B1}$ is connected to bottom surface 1A by a cable guide connection $7_{B1}$. Bottom surface 1A is a support that supports cable guides $4_{A1}$, $4_{B1}$ from below.

Fixed-side member 1 has a symmetrical shape when viewed from the front. Front plate 1B has a low central portion and a high front plate portion on both ends. For example, the central portion of front plate 1B has the height of about half the height of link 5. For example, both the ends of front plate 1B have the height of about twice the height of link 5. The portions on both the ends of front plate 1B are the portions on the end side of the portion in which cable introduction holes $1E_A$, $1E_B$ are provided in the bottom surface 1A. Rear plate 1C has a high central portion and a low both end portion. For example, the height of rear plate 1C is about half the height of link 5 at portions having the length of about 20% from both the ends. The central portion of rear plate 1C has a trapezoidal shape. For example, the height of the trapezoidal portion of rear plate 1C is about three times the height of link 5. For example, the length of the upper bottom portion of the trapezoid is about 40% of the length of rear plate 1C, and the length of the lower bottom portion is about 60%.

Central support 1D is a frame that couples bottom surface 1A and rear plate 1C. Central support 1D is provided between bottom portion 1A and rear plate 1C and between cable introduction holes $1E_A$, $1E_B$. Central support 1D is perpendicular to bottom surface 1A and rear plate 1C. Rear plate 1C can be strengthened structurally by providing central support 1D.

Cable guide mounting portions $6_{A2}$, $6_{A3}$, $6_{B2}$, $6_{B3}$ are provided on a front side of rear plate 1C. Cable guide $4_{A2}$, $4_{A3}$, $4_{B2}$, $4_{B3}$, are mounted on cable guide mounting portion $6_{A2}$, $6_{A3}$, $6_{B2}$, $6_{B3}$, and the ends of cable guide $4_{A2}$, $4_{A3}$, $4_{B2}$, $4_{B3}$ are connected to cable guide mounting portion $6_{A2}$, $6_{A3}$, $6_{B2}$, $6_{B3}$. Cable guide mounting portion 6 includes a bottom surface and a side surface. The side surface is resent on the side of front plate 1B. The bottom surface is resent between the side surface and rear plate 1C. The bottom surface is parallel to bottom surface 1A, and is connected to rear plate 1C perpendicularly. For example, the height of the side surface is about half the height of link 5. The width of the bottom surface of cable guide mounting portion 6 is slightly larger than the width of cable guide 4. For example, the lengths of cable guide mounting portions $6_{A2}$, $6_{B2}$ are the length corresponding to six coupled links 5. For example, the lengths of cable guide mounting portions $6_{A3}$, $6_{B3}$ are the length corresponding to five coupled links 5.

Cable guide mounting portions $6_{A2}$, $6_{A3}$, $6_{B2}$, $6_{B3}$ are provided symmetrically when viewed from the front. Cable guide mounting portion $6_{A2}$ is provided at the position slightly higher than cable guide connection $7_{A1}$ on the central side. Cable guide mounting portion 682 is provided at the position slightly higher than cable guide connection $7_{B1}$ on the central side. Cable guide mounting portion $6_{A2}$ and cable guide mounting portion $6_{B2}$ are provided at the same height position. For example, the height difference between cable guide mounting portions $6_{A2}$, $6_{B2}$ and cable guide connections $7_{A1}$, $7_{B1}$ is about twice the height of link 5. For example, the horizontal distance between cable guide mounting portions $6_{A2}$, $6_{B2}$ and cable guide connections $7_{A1}$, $7_{B1}$ is a length corresponding to five coupled links 5. Cable guide mounting portions $6_{A2}$, $6_{A3}$ are provided at positions where cables $3_{A2}$, $3_{A3}$ introduced through cable introduction hole $1E_A$ can be bent and mounted at appropriate intervals and with an appropriate curvature. Cable guide mounting portion $6_{A2}$ is determined at the position where the distance between cables $3_{A1}$, $3_{A2}$ is also appropriate. Cable guide mounting portions 682, 633 are provided at positions where cables $3_{B2}$, $3_{B3}$ introduced through cable introduction hole $1E_B$ can be bent and mounted at appropriate intervals and with an appropriate curvature. Cable guide mounting portion 682 is determined at the position where the distance between cables $3_{B1}$, $3_{B2}$ is also appropriate.

Cable guide mounting portion $6_{A3}$ is provided at the position slightly higher than cable guide mounting portion $6_{A2}$ on the central side. Cable guide mounting portion $6_{B3}$ is provided at the position slightly higher than cable guide mounting portion $6_{B2}$ on the central side. Cable guide mounting portion $6_{A3}$ and cable guide mounting portion $6_{B3}$ are provided at the same height position. For example, the height difference between cable guide mounting portions $6_{A3}$, $6_{B3}$ and cable guide mounting portions $6_{A2}$, $6_{B2}$ is about twice the height of link 5. For example, the horizontal distance between cable guide mounting portions $6_{A3}$, $6_{B3}$ and cable guide mounting portions $6_{A2}$, $6_{B2}$ is the length corresponding to three coupled links 5.

The end of cable guide $4_{A2}$ is connected to the end on the central side of cable guide mounting portion $6_{A2}$ by cable guide connection $7_{A2}$. The end of cable guide $4_{A3}$ is connected to the end on the central side of cable guide mounting portion $6_{A3}$ by cable guide connection $7_{A3}$. The end of cable guide $4_{B2}$ is connected to the end on the central side of cable guide mounting portion $6_{B2}$ by cable guide connection $7_{B2}$. The end of cable guide $4_{B3}$ is connected to the end on the central side of cable guide mounting portion $6_{B3}$ by cable guide connection $7_{B3}$.

Cable guide connections $7_{A1}$, $7_{A2}$, $7_{A3}$ are arranged at determined intervals. Cable guide connection $7_{A2}$ is disposed at a higher position than cable guide connection $7_{A1}$. Cable guide connection $7_{A3}$ is disposed at a higher position than cable guide connection $7_{A2}$. Similarly, cable guide connections $7_{B1}$, $7_{B2}$, $7_{B3}$ are arranged at determined intervals. Cable guide connection $7_{B2}$ is disposed at a higher position than cable guide connection $7_{B1}$. Cable guide connection $7_{B3}$ is disposed at a higher position than cable guide connection $7_{B2}$. Cable guide connection $7_{A2}$ and cable guide connection $7_{B2}$ are provided at the same height. Cable guide connection $7_{A3}$ and cable guide connection $7_{B3}$ are provided at the same height.

Cable guide connection 7 is a fixed-side connection that connects one end of link 5 connected in series in cable guide 4 to fixed-side member 1. Cable guide connection 7 may be connected to one end of link 5 rotatably, or may be connected with a fixed connection angle. The other end of cable guide 4 is connected to movable-side member 2 rotatably.

Movable-side member 2 includes a structure fixing portion 9 and a cable introducing portion 10. Structure fixing portion 9 fixes movable-side member 2 to the front side and the upper side of movable-side structure 11 that is a moving structure. Cable introducing portion 10 introduces cable 3 into movable-side member 2. A guide end connection 8 is provided in structure fixing portion 9. The ends of cable guides $4_{A1}$, $4_{A2}$, $4_{A3}$, $4_{B1}$, $4_{B2}$, $4_{B3}$ are connected to guide end connection 8 rotatably. The ends of cable guides $4_{A1}$, $4_{A2}$, $4_{A3}$, $4_{B1}$, $4_{B2}$, $4_{B3}$ are connected to guide end connection 8 at determined intervals. Guide end connection 8 is provided in order to secure a space between each of the ends of cable guides $4_{A1}$, $4_{A2}$, $4_{A3}$, $4_{B1}$, $4_{B2}$, $4_{B3}$ and cable introducing portion 10. This space facilitates work of attaching or detaching cable 3 to or from cable guide 4. Structure fixing portion 9 fixes guide end connection 8 to movable-side structure 11. Cable 3 connected to each portion of movable-side structure 11 is introduced into cable introducing portion 10. Cable 3 is attached to any one of cable guides $4_{A1}$, $4_{A2}$, $4_{A3}$, $4_{B1}$, $4_{B2}$, $4_{B3}$. Cable introducing portion 10 is provided above guide end connection 8. The outer shape of cable introducing portion 10 is a pentagonal pillar in which the side surface is shaped like a triangle. In the cable introducing portion 10, all sides, and an outer peripheral portion and two linear portions of the front face are made of metal. The rear side of cable introducing portion 10 is open. A sheet is disposed inside the front side of cable introducing portion 10. The shape of cable introducing portion 10 may be changed.

The shape of movable-side structure 11 illustrated in the drawing is substantially triangular when viewed from the front, and is substantially rectangular when viewed from the side. Movable-side structure 11 rotates around a horizontal rotation shaft together with a structure (not illustrated). Guide end connection 8 is fixed to the front side of movable-side structure 11 by structure fixing portion 9. Guide end connection 8 moves together with movable-side structure 11 and movable-side member 2. Structure fixing portion 9 has a base 17 and a support frame 18. Base 17 is a plate material that is provided while the position is fixed onto the front side of movable-side structure 11. Base 17 is a plate material having a substantially rectangular shape. Base 17 is provided vertically and parallel to the front surface of movable-side structure 11. Five support frames 18 are connected to the upper surface of movable-side structure 11 and the rear surface of base 17. Support frame 18 is a frame having a triangular outer shape when viewed from the side. Support frame 18 fixes base 17 to movable-side structure 11.

Referring to FIG. 12, the structure of guide end connection 8 is described. FIG. 12 illustrates an enlarged view in the vicinity of guide end connection 8 in the perspective view, the front view, the rear view, and the right side view. A part (A) of FIG. 11 is a perspective view, a part (B) is a front view, a part (C) is a rear view, and a part (D) is a right side view. Guide end connection 8 includes front suspending plates $12_{A1}$, $12_{A2}$, $12_{A3}$, $12_{B1}$, $12_{B2}$, $12_{B3}$, back suspending plates $13_{A1}$, $13_{A2}$, $13_{A3}$, $13_{B1}$, $13_{B2}$, $13_{B3}$, a front suspending plate holder 14, a front coupling plate 15, and a back coupling plate 16. One end of each of front suspending plates $12_{A1}$, $12_{A2}$, $12_{A3}$, $12_{B1}$, $12_{B2}$, $12_{B3}$ is connected to a front side of the end of each of cable guides $4_{A1}$, $4_{A2}$, $4_{A3}$, $4_{B1}$, $4_{B2}$, $4_{B3}$. Front suspending plate holder 14 holds the other end of each of front suspending plates $12_{A1}$, $12_{A2}$, $12_{A3}$, $12_{B1}$, $12_{B2}$, $12_{B3}$ rotatably. Front suspending plate holder 14 has a fixed plate 14A and a support frame 14B.

Fixed plate 14A is a plate material provided in parallel to base 17. Five support frames 14B fix fixed plate 14A to base 17. Support frame 14B has a shape in which a triangular frame is connected onto a column perpendicular to base 17. Front coupling plate 15 is a plate-shaped coupling member that couples one end of each of front suspending plates $12_{A1}$, $12_{A2}$, $12_{A3}$, $12_{B1}$, $12_{B2}$, $12_{B3}$. The place where the front coupling plate 15 couples one end of each of front suspending plates $12_{A1}$, $12_{A2}$, $12_{A3}$, $12_{B1}$, $12_{B2}$, $12_{B3}$ is the place where one end of each of front suspending plates $12_{A1}$, $12_{A2}$, $12_{A3}$, $12_{B1}$, $12_{B2}$, $12_{B3}$ is connected to the front side of the end of each of cable guides $4_{A1}$, $4_{A2}$, $4_{A3}$, $4_{B1}$, $4_{B2}$, $4_{B3}$. In cable guide 4 and link 5, the front surface directing in the direction of the front side of suspending device 90 and the rear surface directing in the direction of the back side of suspending device 90 are two side surfaces sandwiching the first surface and the second surface.

One end of each of back suspending plates $13_{A1}$, $13_{A2}$, $13_{A3}$, $13_{B1}$, $13_{B2}$, $13_{B3}$ is connected to the back side of the end of each of cable guides $4_{A1}$, $4_{A2}$, $4_{A3}$, $4_{B1}$, $4_{B2}$, $4_{B3}$. The other end of each of back suspending plates $13_{A1}$, $13_{A2}$, $13_{A3}$, $13_{B1}$, $13_{B2}$, $13_{B3}$ are connected to base 17 rotatably. Back coupling plate 16 is a plate-shaped coupling member that couples one end of each of back suspending plates $13_{A1}$, $13_{A2}$, $13_{A3}$, $13_{B1}$, $13_{B2}$, $13_{B3}$. The place where back coupling plate 16 couples one end of each of back suspending plate $13_{A1}$, $13_{A2}$, $13_{A3}$, $13_{B1}$, $13_{B2}$, $13_{B3}$ is the place where one end of each of back suspending plates $13_{A1}$, $13_{A2}$, $13_{A3}$, $13_{B1}$, $13_{B2}$, $13_{B3}$ is connected to the back side of the end of each of cable guide $4_{A1}$, $4_{A2}$, $4_{A3}$, $4_{B1}$, $4_{B2}$, $4_{B3}$.

Front suspending plate $12_{A1}$ and back suspending plate $13_{A1}$ have the same shape and overlap with each other completely when viewed from the front. A rotation shaft which connects the other end of front suspending plate $12_{A1}$ to front suspending plate holder 14 rotatably and a rotation shaft which connects the other end of back suspending plate $13_{A1}$ to base 17 rotatably are present on the same straight line. The rotation shaft which connects one end of front suspending plate $12_{A1}$ to cable guide $4_{A1}$ and front coupling plate 15 rotatably and the rotation shaft which connects one end of back suspending plate $13_{A1}$ to cable guide $4_{A1}$ and back coupling plate 16 rotatably are present on the same straight line. All the rotation shafts that rotate front suspending plate $12_{A1}$, back suspending plate $13_{A1}$, and cable guide $4_{A1}$ are perpendicular to base 17, front coupling plate 15, and back coupling plate 16. Front suspending plate $12_{A1}$ and back suspending plate $13_{A1}$ are two opposing connecting members in which one end of each of front suspending plate $12_{A1}$ and back suspending plate $13_{A1}$ is connected rotatably to each of the two side surfaces of link 5 at the end of cable guide $4_{A1}$ while the other end is connected rotatably to movable-side member 2. Each of front suspending plate $12_{A1}$ and back suspending plate $13_{A1}$ is a movable-side connection that connects the other end of cable guide $4_{A1}$ rotatably.

The relationship similar to the relationship between front suspending plate $12_{A1}$ and back suspending plate $13_{A1}$ is satisfied regarding front suspending plate $12_{A2}$ and back suspending plate $13_{A2}$, front suspending plate $12_{A3}$ and back suspending plate $13_{A3}$, front suspending plate $12_{B1}$ and back suspending plate $13_{B1}$, front suspending plate $12_{B2}$ and back suspending plate $13_{B2}$, and front suspending plate $12_{B3}$ and back suspending plate $13_{B3}$. Front suspending plate $12_{A1}$ and back suspending plate $13_{A1}$, front suspending plate $12_{A2}$ and back suspending plate $13_{A2}$, front suspending plate $12_{A3}$ and back suspending plate $13_{A3}$, front suspending plate $12_{B1}$ and back suspending plate $13_{B1}$, front suspending plate $12_{B2}$ and back suspending plate $13_{B2}$, front suspending plate $12_{B3}$ and the back suspending plate 1383 are arranged at determined intervals.

Each pair of front suspending plate $12_{A2}$ and back suspending plate $13_{A2}$, front suspending plate $12_{A3}$ and back suspending plate $13_{A3}$, front suspending plate $12_{B1}$ and back suspending plate $13_{B1}$, front suspending plate $12_{B2}$ and back suspending plate $13_{B2}$, and front suspending plate $12_{B3}$ and back suspending plate $13_{B3}$ is the movable-side connection that connects the other end of each of cable guides $4_{A2}$, $4_{A3}$, $4_{B1}$, $4_{B2}$, $4_{B3}$ rotatably, and is also the two opposing connecting members in which one end of each of the two side surfaces of link 5 located at the endmost position of each of cable guide $4_{A2}$, $4_{A3}$, $4_{B1}$, $4_{B2}$, $4_{B3}$ while the other end is connected to movable-side member 2 rotatably. Front coupling plate 15 and back coupling plate 16 are two coupling members. Each of the two coupling members couples each of the two opposing connecting members that is the movable-side connection included in each of cable guides $4_{A1}$, $4_{A2}$, $4_{A3}$, $4_{B1}$, $4_{B2}$, $4_{B3}$ in each of the two side surfaces of link 5.

Because guide end connection 8 is provided, each of cable guided $4_{A1}$, $4_{A2}$, $4_{A3}$, $4_{B1}$, $4_{B2}$, $4_{B3}$ hangs vertically with determined intervals in the horizontal direction. Even when movable-side member 2 moves and the positions and angles of base 17 and front suspending plate holder 14 are changed, cable guides $4_{A1}$, $4_{A2}$, $4_{A3}$, $4_{B1}$, $4_{B2}$, $4_{B3}$ always hang vertically.

Referring to FIGS. 13 to 22, the structure of link 5 constituting cable guide 4 is described. Link 5 shown in FIG. 13 and the like is link 5 used for cable guides $4_{A3}$, $4_{B3}$. Cable guide 4 is an articulated body in which the plurality of links 5 are connected in series. Link 5 is a frame body having a substantially rectangular parallelepiped space inside link 5. Link 5 includes a first side plate 51, a second side plate 52, a first surface portion 53, a second surface portion 54, a cushioning material 55, a first coupling portion 56, and a second coupling portion 57. First side plate 51 is a member that becomes one side surface of link 5. Second side plate 52 is a member that becomes the other side surface of link 5. First side plate 51 and second side plate 52 are provided to face in parallel. First side plate 51 and second side plate 52 are in a mirror image relationship. First side plate 51 and second side plate 52 are in a plane-symmetrical relationship with respect to a plane being present in the middle. First side plate 51 and second side plate 52 are plate-shaped members. The surface parallel to the side surface of link 5 is referred to as a principal surface of first side plate 51 and second side plate 52. The side surfaces of first side plate 51 and second side plate 52 are a surface perpendicular to the principal surface.

Figure 14:
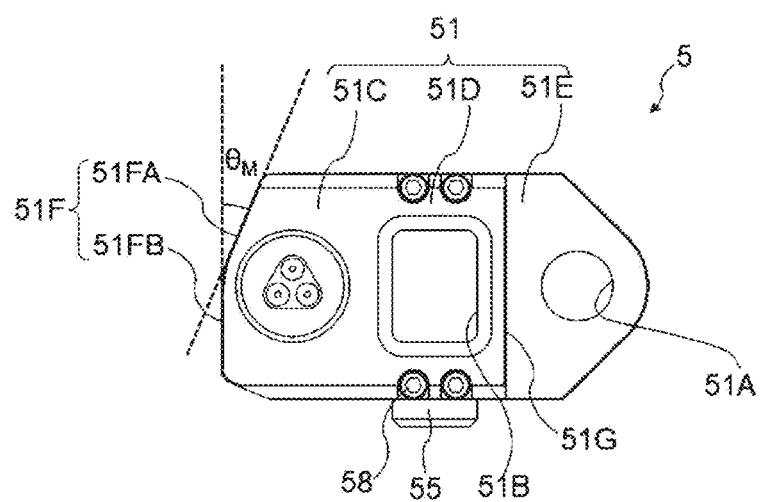
FIG. 14 is a front view illustrating the structure of the link included in the suspending device of Embodiment 1.
Figure 15:
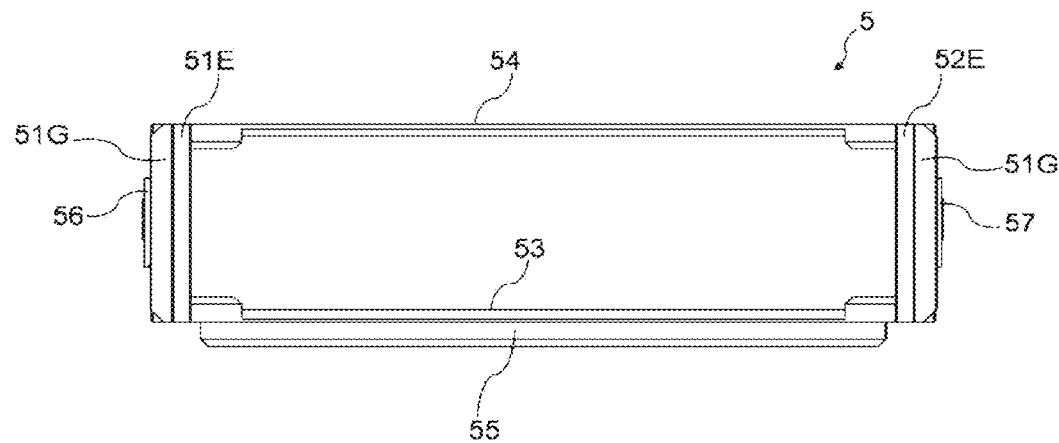
FIG. 15 is a right side view illustrating the structure of the link included in the suspending device of Embodiment 1.
Figure 16:
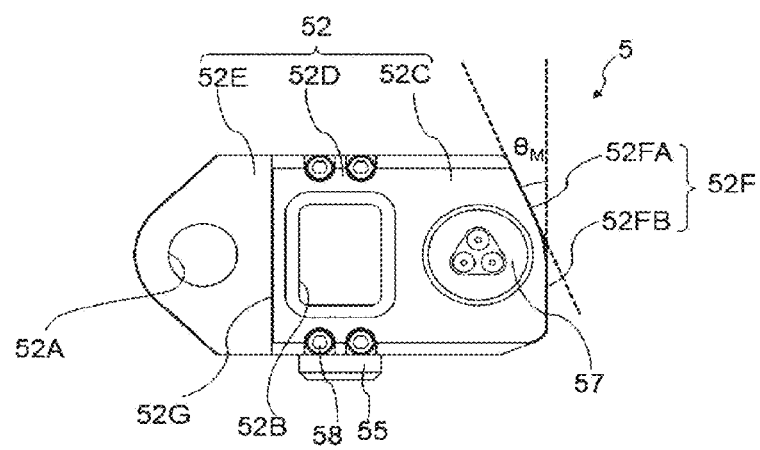
FIG. 16 is a rear view illustrating the structure of the link included in the suspending device of Embodiment 1.
Figure 17:
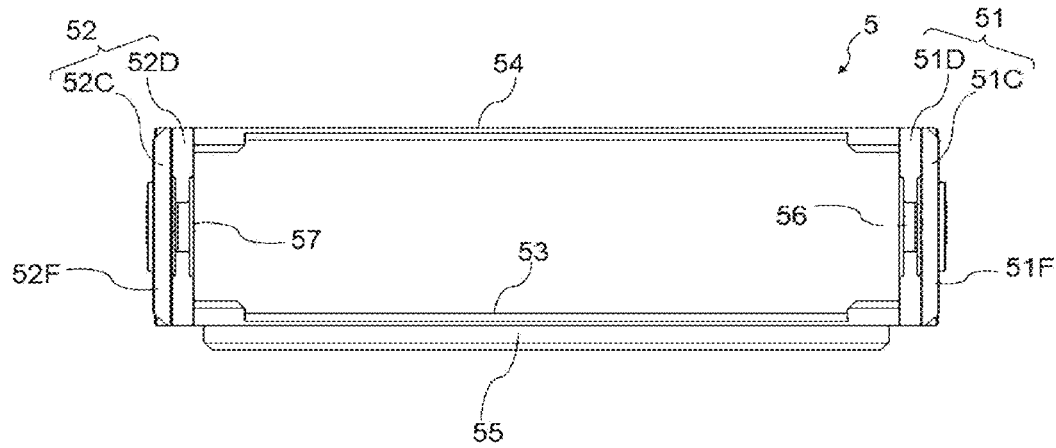
FIG. 17 is a left side view illustrating the structure of the link included in the suspending device of Embodiment 1.

In FIG. 14 and the like, link 5 is illustrated while the principal surface of first side plate 51 is oriented to the front. Link 5 is connected to another link 5 in the left-right direction shown in FIG. 14. Link 5 contains and protects cable 3 extending in the left-right direction shown in FIG. 14. Cable 3 extends in a longitudinal direction of first side plate 51 and the second side plate 52. The longitudinal direction of first side plate 51 and second side plate 52 is the same as the extending direction. Link 5 has the determined length in the extending direction of cable 3.

The lower surface of link 5 shown in FIGS. 14 to 17 is referred to as the first surface, and the upper surface is referred to as the second surface. First surface portion 53 fixes first side plate 51 and second side plate 52 to each other in the first surface. Second surface portion 54 fixes first side plate 51 and second side plate 52 to each other in the second surface. First surface portion 53 and second surface portion 54 have the same shape. First surface portion 53 and second surface portion 54 are provided at the same positions in the extending direction of first side plate 51 and second side plate 52. First surface portion 53 and second surface portion 54 are fixed to first side plate 51 and second side plate 52 by a bolt 58. Not including cushioning material 55, link 5 has a substantially rectangular parallelepiped outer shape. Bolt 58 is inserted into a screw hole provided in the recess such that a head of bolt 58 does not protrude from first side plate 51 or second side plate 52.

Cushioning material 55 is provided such that link 5 or another object is not damaged when link 5 comes into contact with another object or link 5 constituting another cable guide 4. Cushioning material 55 is made of resin having appropriate elasticity. Cushioning material 55 is provided on a surface that may come into contact with another link 5. Because link 5 shown in FIG. 13 and the like is used for cable guides $4_{A3}$, $4_{B3}$, cushioning material 55 is provided only on first surface portion 53. Each of cable guide $4_{A2}$, $4_{B2}$ is present on the side of first surface portion 53 of each of cable guide $4_{A3}$, $4_{B3}$. Cushioning material 55 is provided on the outer surface of link 5 of first surface portion 53. In link 5 used for cable guides $4_{A2}$, $4_{B2}$, cushioning material 55 is provided on first surface portion 53 and second surface portion 54. In link 5 used for cable guides $4_{A1}$, $4_{B1}$, cushioning material 55 is provided on second surface portion 54.

First coupling portion 56 couples first side plate 51 to first side plate 51 of another link 5 rotatably. Second coupling portion 57 couples second side plate 52 to second side plate 52 of another link 5 rotatably. First coupling portion 56 and second coupling portion 57 are connections that connects link 5 to adjacent link 5 at a determined angle or rotatably within a determined angle range.

First coupling portion 56 and second coupling portion 57 have the same structure. The structures of first coupling portion 56 and second coupling portion 57 is described later.

As illustrated in FIG. 14, the outer shape of first side plate 51 is substantially rectangular when viewed from the front. In first side plate 51, first coupling portion 56 is provided on the left side in the drawings, a circular through-hole 51A is provided on the right side, and a substantially rectangular through-hole 51B is provided in the center. In first side plate 51, the portion where first coupling portion 56 is provided is referred to as a first side plate first end 51C, the portion where through-hole 51B is provided is referred to as a first side plate central portion 51D, and through-hole 51A is provided is referred to as a first side plate second end 51E.

The outline on the left side of first side plate first end 51C has a shape in which the upper left corner of the rectangle surrounding first side plate 51 is cut away a triangle at a determined angle θM and connected to a straight line on the left side of the rectangle by an arc. The height of the cut triangle is about half the height of first side plate 51. The side surface on the left side of first side plate first end 51C is referred to as a first abutting surface 51F. First abutting surface 51F includes a first inclined abutting surface 51FA inclined by an angle θM on the side of the second surface and a first parallel abutting surface 51FB on the side of the first surface. First inclined abutting surface 51FA and first parallel abutting surface 51FB are equidistant from the center of the rotation shaft of first coupling portion 56.

The outline on the right side of first side plate second end 51E is a line in which the upper right and lower right corners of the rectangle surrounding first side plate 51 are cut out largely by straight lines and connected by an arc. The arc is provided such that the distance from through-hole 51A is constant. Through-hole 51A is a hole through which the rotation shaft of first coupling portion 56 is passed. Through-hole 51B made in first side plate central portion 51D is a hole reducing a weight of first side plate 51.

Figure 18:
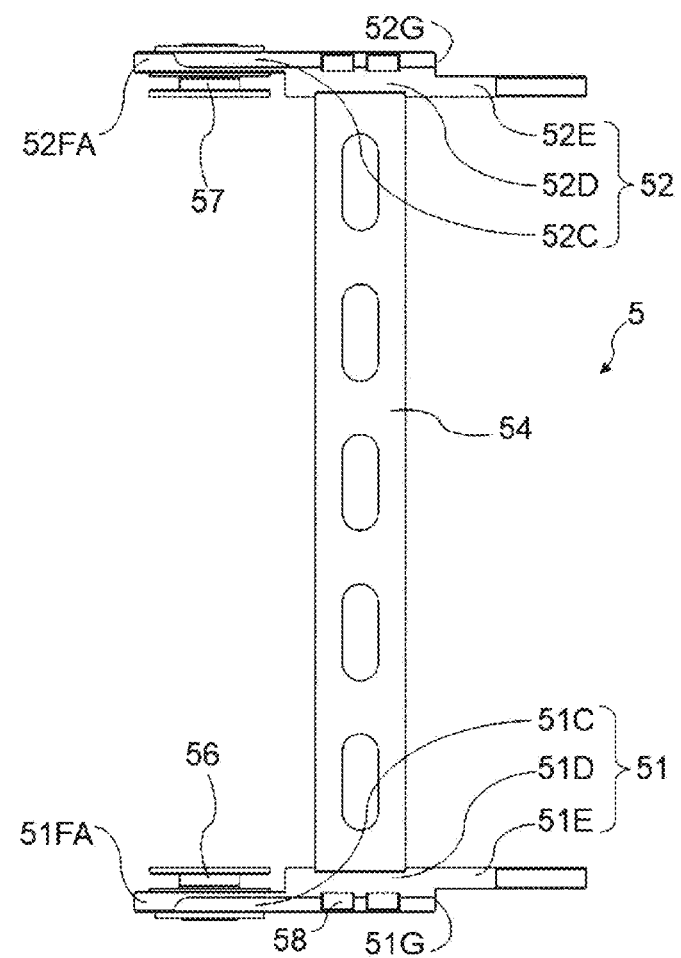
FIG. 18 is a plan view illustrating the structure of the link included in the suspending device of Embodiment 1.
Figure 19:
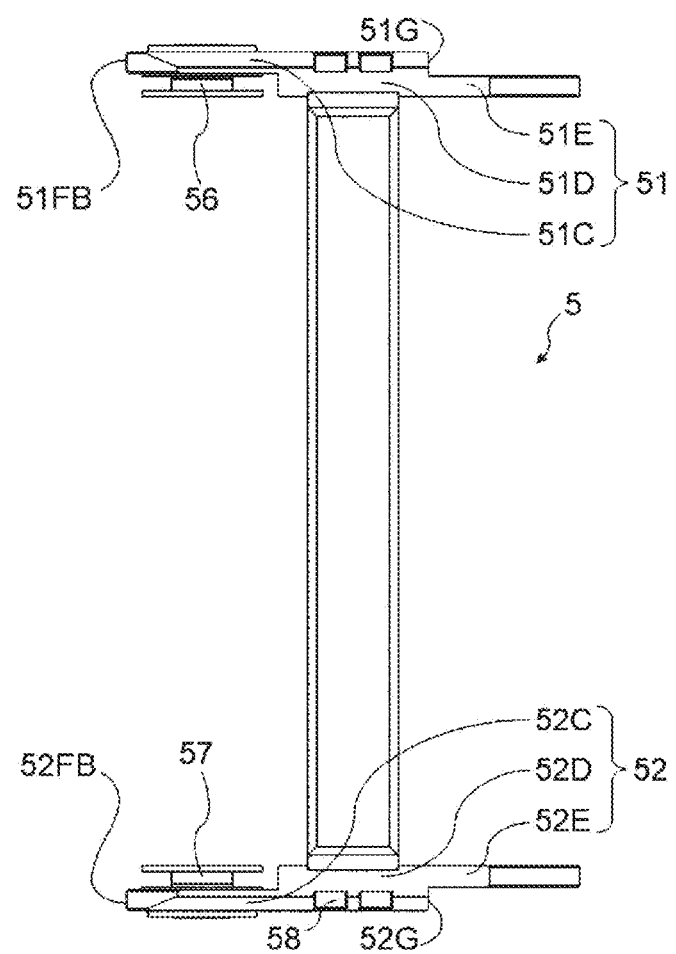
FIG. 19 is a bottom view illustrating the structure of the link included in the suspending device of Embodiment 1.

First surface portion 53 and second surface portion 54 are connected to first side plate central portion 51D. As illustrated in FIGS. 18 and 19, the thicknesses of first side plate first end 51C and first side plate second end 51E are about half the thickness of first side plate central portion 51D. An outside surface of first side plate first end 51C is connected in the same level to an outside surface of first side plate central portion 51D. A space is produced inside first side plate first end 51C. The inner surfaces of first side plate second end 51E and first side plate central portion 51D are connected in the same level to each other. A space is produced outside first side plate second end 51E. That is, in the outer surface of first side plate 51, a level difference is formed between first side plate central portion 51D and first side plate second end 51E on the right side of first side plate central portion 51D. The side surface of first side plate central portion 51D formed by this level difference is referred to as a second abutting surface 51G. Second abutting surface 51G is parallel to a side of the rectangle surrounding first side plate 51.

First side plate second end 51E of adjacent link 5 enters into the space inside first side plate first end 51C. First coupling portion 56 connects rotatably first side plate first end 51C and first side plate second end 51E of adjacent link 5. The rotation shaft of first coupling portion 56 is passed through a through-hole 51H (illustrated in FIG. 21) included in first side plate first end 51C and through-hole 51A included in first side plate second end 51E while the centers of circular through-hole 51H and through-hole 51A are matched with each other. Accordingly, first side plate first end 51C and first side plate second end 51E of adjacent link 5 are coupled to each other rotatably. In this way, first coupling portion 56 couples first side plate 51 and first side plate 51 of adjacent link. When link 5 is coupled, first abutting surface 51F comes into contact with second abutting surface 51G of coupled link 5.

Second side plate 52 has a structure similar to that of first side plate 51. Second side plate 52 includes a first side plate first end 52C, a first side plate central portion 52D, a first side plate second end 52E, a through-hole 52A, a through-hole 52B, a first abutting surface 52F, and a second abutting surface 52G. Second side plate 52 is coupled to second side plate 52 of adjacent link 5 rotatably by second coupling portion 57. When link 5 is coupled, first abutting surface 52F comes into contact with second abutting surface 52G of coupled link 5.

First abutting surface 51F and second abutting surface 51G of adjacent link 5 and first abutting surface 52F and second abutting surface 52G of adjacent link 5 constitute a connection angle limiter that limits the connection angle between adjacent link 5 and link 5 in first coupling portion 56 and second coupling portion 57 within a determined connection angle range.

Link 5 is symmetrical. Furthermore, link 5 is vertically symmetrical except that first inclined abutting surface 51FA and first inclined abutting surface 52FA are provided and that cushioning material 55 is provided only in first surface portion 53. Accordingly, link 5 in which first inclined abutting surface 51FA and first inclined abutting surface 52FA are provided on the side of the first surface is obtained by turning second side plate 52 toward the front and by replacing cushioning material 55 with second surface portion 54.

Figure 20:
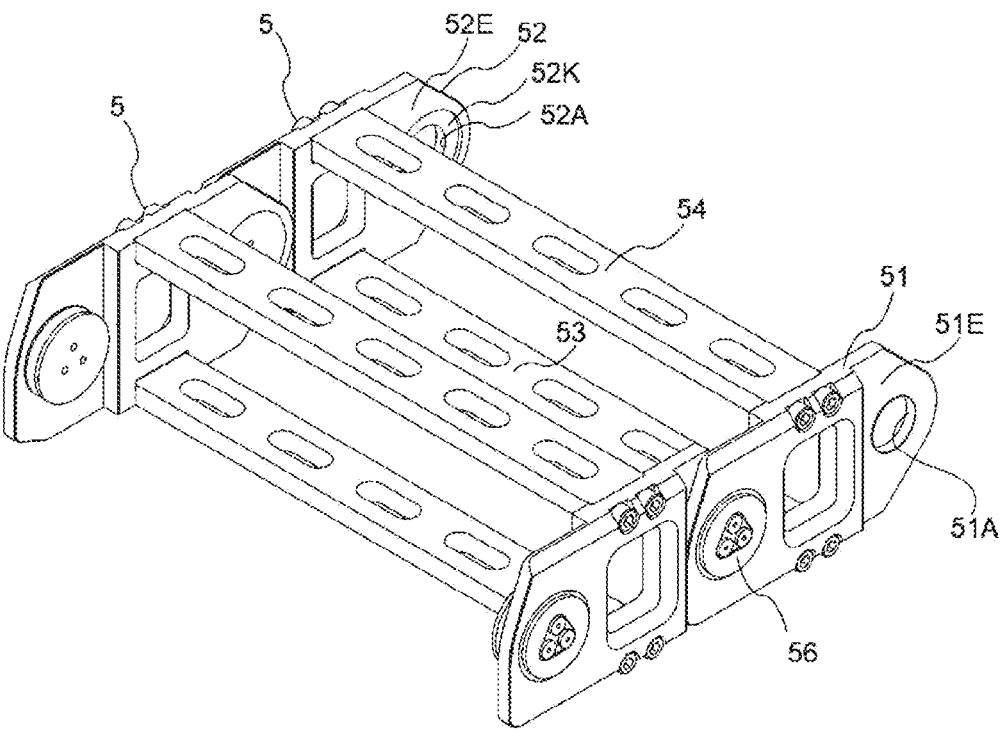
FIG. 20 is a perspective view illustrating the coupled links included in the suspending device of Embodiment 1.
Figure 21:
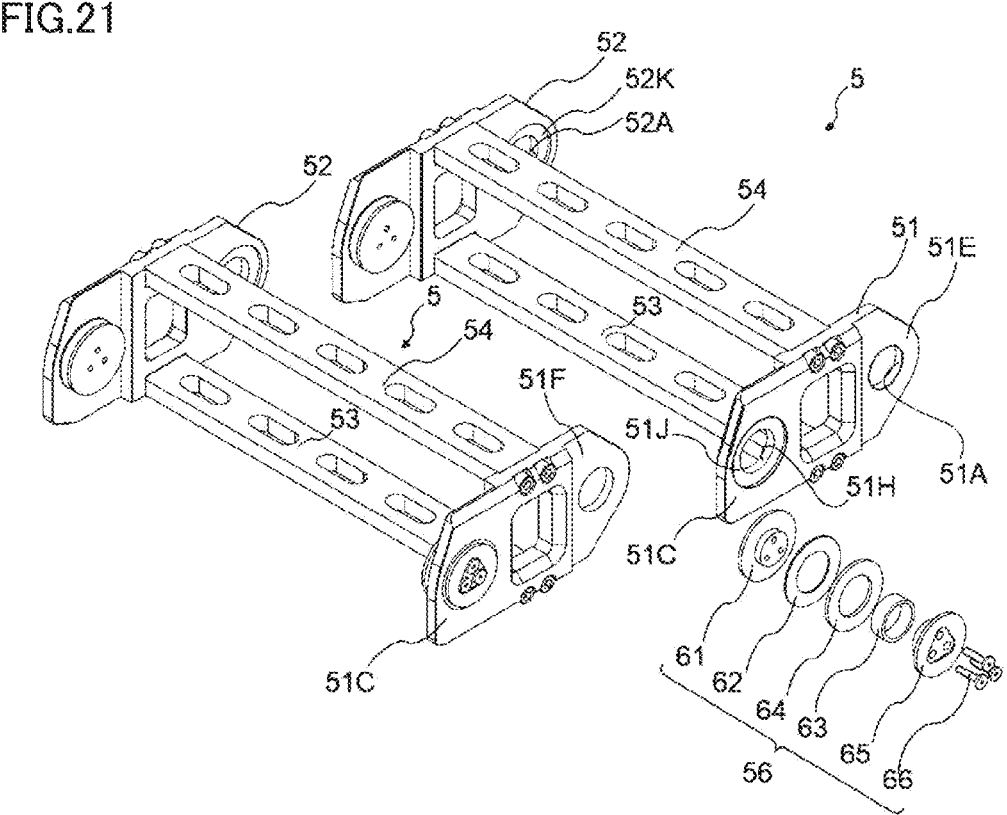
FIG. 21 is a perspective view illustrating a state before the links included in the suspending device of Embodiment 1 are coupled.
Figure 22:
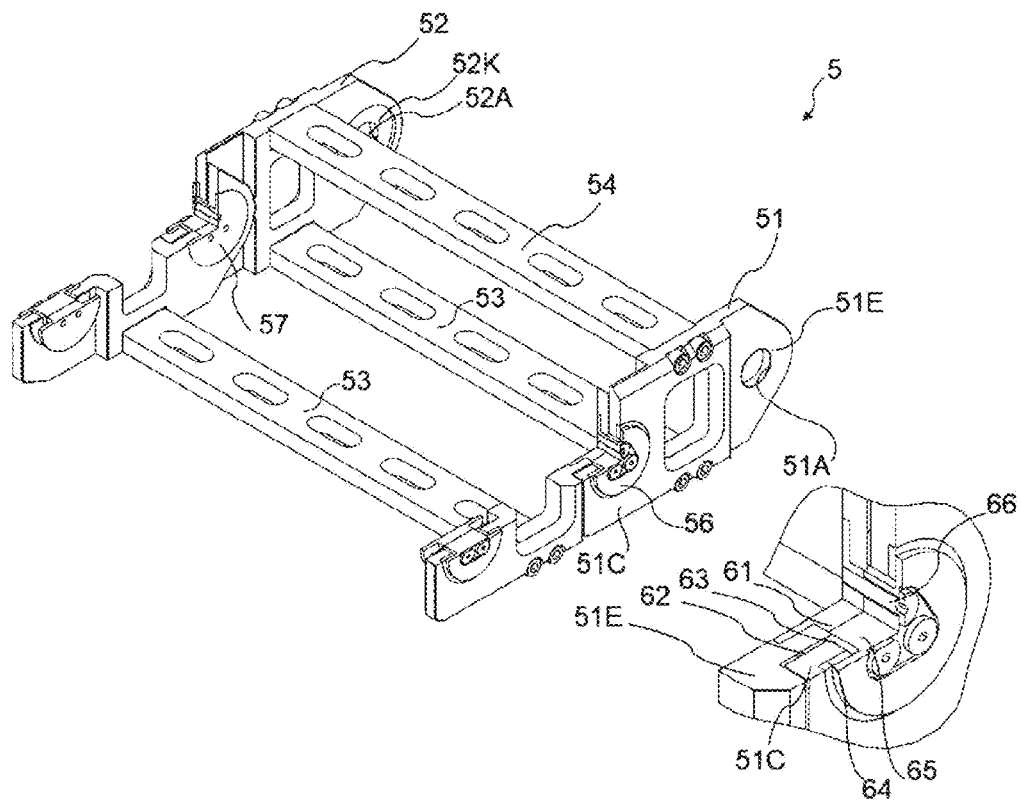
FIG. 22 is a perspective view illustrating the coupled links whose part is cut away included in the suspending device of Embodiment 1.

Referring to FIGS. 20 to 22, the structures of first coupling portion 56 and second coupling portion 57 are described. First coupling portion 56 and second coupling portion 57 have the same structure. FIG. 20 is a perspective view of coupled links 5. FIG. 21 is a perspective view illustrating link 5 in the state before being coupled. FIG. 22 is a view illustrating of coupled links 5 whose part is cut away.

As illustrated in FIG. 21, first coupling portion 56 and second coupling portion 57 have an inner shaft member 61, an inner washer 62, a ring bearing 63, an outer washer 64, an outer shaft member 65, and three bolts 66. Inner shaft member 61 has a shape having a short cylindrical shaft and a circular flange. Outer shaft member 65 also has the shape having the short cylindrical shaft and the circular flange. A tip of the shaft of each of inner shaft member 61 and outer shaft member 65 is a plane perpendicular to the side surface of the shaft. Three screw holes are made at corresponding positions inner shaft member 61 and outer shaft member 65. The three screw holes are made at positions having a rotational symmetry of 120 degrees. The screw holes penetrate the shafts of inner shaft member 61 and outer shaft member 65. Inner shaft member 61 and outer shaft member 65 are connected by bolt 66 screwed into the screw hole. The shaft of connected inner shaft member 61 and outer shaft member 65 is the rotation shaft of first coupling portion 56 or second coupling portion 57. A counter sinking that is a triangular recess is provided in the outer surface of the flange of outer shaft member 65. The triangular counter sinking has a flat bottom surface and side surfaces perpendicular to the bottom surface. Three screw holes are made in the bottom surface of the triangular counter sinking. The triangular counter sinking is provided such that the heads of three bolts 66 do not protrude from outer shaft member 65. Inner washer 62 and outer washer 64 are thin annular plates. Outer washer 64 is thicker than inner washer 62. Ring bearing 63 is a cylindrical member.

The outer diameter of ring bearing 63 is smaller than the inner diameters of inner washer 62 and outer washer 64. The inner diameter of ring bearing 63 is larger than the outer diameters of the shafts of inner shaft member 61 and outer shaft member 65. The outer diameter of the shaft of inner shaft member 61 and the outer diameter of the shaft of outer shaft member 65 are the same. The outer diameter of the flange of inner shaft member 61, the outer diameter of inner washer 62, and the outer diameter of outer washer 64 are the same. The outer diameter of the flange of outer shaft member 65 is smaller than the outer diameter of outer washer 64. The inner diameter of through-hole 51H is larger than the inner diameter of through-hole 51A. The shaft of outer shaft member 65 and ring bearing 63 are inserted into through-hole 51H. The shaft of inner shaft member 61 is inserted into through-hole 51A.

First side plate first end 51C includes through-hole 51H and a counter sinking 51J. Through-hole 51H and counter sinking 51J have a circular shape. Counter sinking 51J is a recess provided around through-hole 51H in the outer surface of first side plate first end 51C. Counter sinking 51J includes a flat bottom surface and side surfaces perpendicular to the bottom surface. Outer washer 64 enters counter sinking 51J.

First side plate second end 51E includes through-hole 51A and a counter sinking 51K. Through-hole 51A and counter sinking 51K have a circular shape. Counter sinking 51K is a recess provided around through-hole 51A in the inner surface of first side plate second end 51E. Counter sinking 51K includes a flat bottom surface and side surfaces perpendicular to the bottom surface. The flange of inner shaft member 61 enters counter sinking 51K.

An example of a procedure for coupling first side plate first end 51C and first side plate second end 51E of adjacent link 5 by first coupling portion 56 is described. First, ring bearing 63 is inserted into through-hole 51H from the outside of first side plate first end 51C. The shaft of outer shaft member 65 is inserted into through-hole 51H and ring bearing 63 while the shaft of outer shaft member 65 is passed through outer washer 64. Inner washer 62 is hung on the tip of the shaft of outer shaft member 65 protruding the inside of first side plate first end 51C. The tip of the shaft of outer shaft member 65 is inserted into through-hole 51A of first side plate second end 51E of adjacent link 5. First side plate first end 51C and of first side plate second end 51E of adjacent link 5 are brought into close contact with each other such that inner washer 62 does not fall off the shaft of outer shaft member 65. Inner shaft member 61 is inserted from the inside into through-hole 51A and counter sinking 51K. The tip of the shaft of outer shaft member 65 and the tip of the shaft of inner shaft member 61 are brought into contact with each other. Outer member 65 or inner shaft member 61 is rotated to the position where the screw hole of outer shaft member 65 and the screw hole of inner shaft member 61 communicate with each other. Bolt 66 is screwed into the screw hole while the screw hole of outer shaft member 65 and the screw hole of inner shaft member 61 communicate with each other. Outer member 65 and inner shaft member 61 are connected by fastening with bolts 66.

Second coupling portion 57 couples second side plate first end 52C and second side plate second end 52E of adjacent link 5 in the same procedure. In this way, the state shown in FIGS. 20 and 22 is obtained.

Outer shaft member 65, first side plate first end 51C, and first side plate second end 51E of adjacent link 5 is not in contact directly with each other. Outer washer 64 exists between the flange of outer shaft member 65 and first side plate first end 51C. Ring bearing 63 exists between the shaft of outer shaft member 65 and first side plate first end 51C. Inner washer 62 exists between first side plate first end 51C and first side plate second end 51E of adjacent link 5. Inner washer 62, ring bearing 63, and outer washer 64 are made of a material that generates less friction on the surface and is resistant to wear. Appropriate play exists among the shafts of inner shaft member 61 and outer shaft member 65, inner washer 62, ring bearing 63, outer washer 64, the flange of inner shaft member 61, the flange of outer shaft member 65, first side plate first end 51C, and first side plate second end 51E while the shaft of outer shaft member 65 and the shaft of inner shaft member 61 are coupled to each other firmly. Accordingly, the connection angle of first side plate first end 51C and first side plate second end 51E can be changed smoothly. Because no lubricating oil is used, first coupling portion 56 and second coupling portion 57 do not require maintenance.

In the state where link 5 is coupled, first abutting surface 51F is in contact with second abutting surface 51G of adjacent link 5, and first abutting surface 52F is in contact with second abutting surface 52G of adjacent link 5. First abutting surface 51F includes first inclined abutting surface 51FA inclined at angle $\theta M$ on the side of the second surface and first parallel abutting surface 51FB on the side of the first surface. First abutting surface 52F includes first inclined abutting surface 52FA inclined at angle θM on the side of the second surface and first parallel abutting surface 52FB on the side of the first surface.

When first inclined abutting surface 51FA is in contact with second abutting surface 51G and first inclined abutting surface 52FA is in contact with second abutting surface 52G, link 5 is connected to adjacent link 5 diagonally at angle θM. When first parallel abutting surface 51FB is in contact with second abutting surface 51G and first parallel abutting surface 52FB is in contact with second abutting surface 52G, link 5 is connected to adjacent link 5 linearly in the same direction. It is assumed that connection angle θ between link 5 and adjacent link 5 is 0 degrees when link 5 and adjacent link 5 are connected to each other linearly, and that connection angle θ is positive (>0 degrees) when link 5 and adjacent link 5 are connected while the side of the second surface becomes concave. Connection angle θ of link 5 and adjacent link 5 can be changed within the range of θM≥θ≥0. Link 5 in which connection angle θ can be changed within the range of θM≥θ≥0 is referred to as a type 1 link 5. In type 1 link 5, the connection angle range is the range of θM≥θ≥0.

In link 5 in which first inclined abutting surface 51FA and first inclined abutting surface 52FA are provided on the side of the first surface, connection angle θ between link 5 and adjacent link 5 can be changed in the range of 0≥θ≥−θM. Link 5 in which connection angle θ can be changed within the range of 0≥θ≥−θM is referred to as a type 2 link 5. In type 2 link 5, the connection angle range is the range of 0≥θ≥−θM. Type 1 link 5 and type 2 link 5 have different connection angle ranges.

Figure 23:
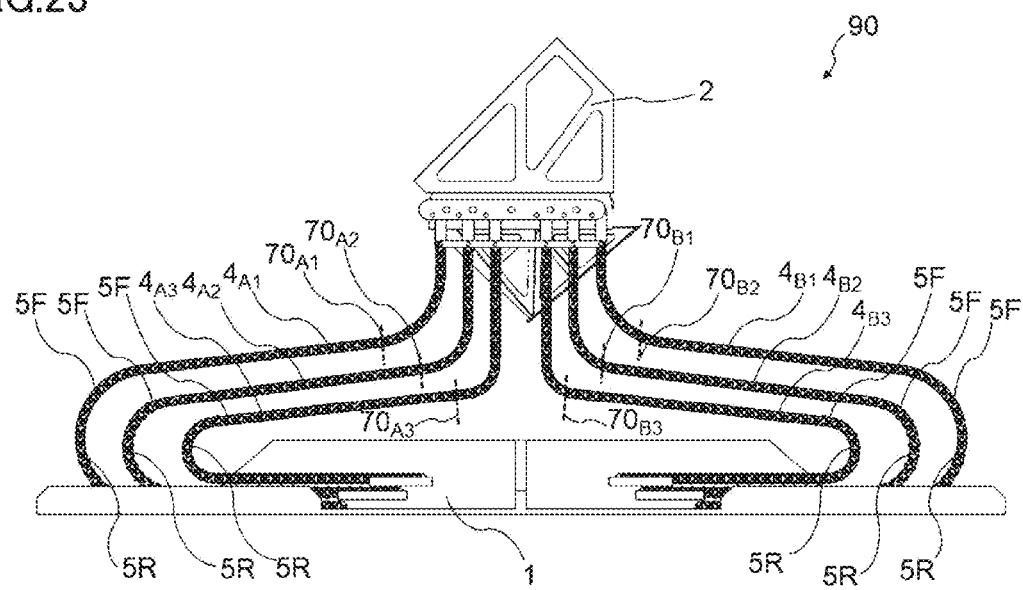
FIG. 23 is a front view illustrating a boundary of a link type boundary in the cable guide included in the suspending device of Embodiment 1.

In cable guide 4, the surface that is in contact with fixed-side member 1 at the end close to fixed-side member 1 and that becomes concave or convex is defined as a first surface 5F, and the opposite surface of first surface 5F is defined as a second surface 5R. First surface 5F and second surface 5R are illustrated in FIGS. 9 and 23.

The following relationship is satisfied between connection angle θ (degrees) of link 5 and a curvature κ when links 5 are connected by a polygonal line. Where, L (m) is the length of link 5 in the extending direction.

$$\kappa = (2/L) * \sin(\pi * (\theta/360))$$

Curvature κ may be determined to take a positive value when first surface 5F is either one of concave or convex, and to take a negative value when first surface 5F is the other of concave or convex. In this description, connection angle θ and curvature κ are defined to take positive values when first surface 5F is concave. When first surface 5F is convex, connection angle θ and curvature κ may be defined to take positive values. When first surface 5F is concave, connection angle θ may be defined to take a positive value, and curvature κ may be defined to take a negative value. When first surface 5F is convex, connection angle θ may be defined to take a positive value, and curvature κ may be defined to take a negative value.

Connection angle θ between link 5 and adjacent link 5 may be a value different from 0 degrees when the angle at which links 5 are connected linearly. A connection angle θ1 when second surface 5R becomes concave is larger (θ1>θ2) than a connection angle θ2 when second surface 5R becomes linear. Connection angle θ may be determined such that connection angle θ1 in the case where second surface 5R becomes concave is smaller than connection angle θ2 in the case where second surface 5R becomes linear (θ1<θ2).

The connection angle range is determined by a first limit value that is one of two limit values and a second limit value that is the other limit value. In this specification, the first limit value is a limit value that defines a maximum absolute value of the curvature that makes second surface 5R concave. Connection angle θ is 0 degrees when links 5 are connected linearly, and connection angle θ is positive (>0 degrees) when links 5 are connected such that second surface 5R is concave. Accordingly, an upper limit of the connection angle range, namely, the limit value that determines the upper limit of connection angle θ is the first limit value. A lower limit of the connection angle range, namely, the limit value that determines the lower limit of connection angle θ is the second limit value. The first limit value is determined to be the upper limit or the lower limit of the connection angle range depending on a method for measuring the connection angle and whether first surface 5F or second surface 5R is concave when the curvature is positive.

The connection angle range at which link 5 is connected to adjacent link 5 rotatably can be changed by changing an inclination angle θM of first inclined abutting surface 51FA and first inclined abutting surface 52FA. Inclination angle θM determines the maximum curvature that allows cable guide 4 to bend. The maximum curvature is the curvature in which the absolute value is maximum. When inclination angle θM is large, the maximum value of the absolute value of the curvature becomes large. For link 5 used for cable guides $4_{A3}$, $4_{B3}$ angle θM is determined to be θM=22.5 degrees, for link 5 used for cable guides $4_{A2}$, $4_{B2}$ angle θM is determined to be θM=15 degrees, and for link 5 used for cable guides $4_{A1}$, $4_{B1}$ angle θM is determined to be θM=10 degrees. Because angle θM of each of cable guides $4_{A1}$, $4_{A2}$, $4_{A3}$, $4_{B1}$, $4_{B2}$, $4_{B3}$ is determined in this way, the maximum curvature of cable guides $4_{A1}$, $4_{B1}$ is smaller than the maximum curvature of cable guides $4_{A2}$, $4_{B2}$. The maximum curvature of cable guides $4_{A2}$, $4_{B2}$ is smaller than the maximum curvature of cable guides $4_{A3}$, $4_{B3}$. Because the maximum curvature of cable guide 4 disposed on the outside is small, a radius of bending becomes larger toward the outside, and cable guides $4_{A1}$, $4_{A2}$, $4_{A3}$, $4_{B1}$, $4_{B2}$, $4_{B3}$ can be disposed while a space is provided as illustrated in FIG. 3 and the like.

In cable guide 4, the surface that is in contact with fixed-side member 1 at the end close to fixed-side member 1 and that becomes concave or convex is defined as first surface 5F, and the opposite surface of first surface 5F is defined as second surface 5R. First surface 5F and second surface 5R are one surface and the other surface in the two surfaces that become concave or convex depending on the connection angle of links 5 in the plurality of links 5. In cable guide 4, type 1 link 5 that enables the connection in which second surface 5R becomes concave is used in the portion close to fixed-side member 1, and type 2 link 5 that enables the connection in which first surface 5F becomes concave is used in the portion far from fixed-side member 1. FIG. 23 is a front view illustrating a link type boundary in the cable guide. In each of cable guides $4_{A1}$, $4_{A2}$, $4_{A3}$, the central side (right side) of each of boundary lines $70_{A1}$, $70_{A2}$, $70_{A1}$ is type 2 link 5 that can be connected such that first surface 5F becomes concave. The outside (left side) of each of boundary lines $70_{A1}$, $70_{A2}$, $70_{A3}$ is type 1 link 5 that can be connected such that second surface 5R becomes concave. In each of cable guided $4_{B1}$, $4_{B2}$, $4_{B3}$, the central side (left side) of each of boundary lines $70_{B1}$, $70_{B2}$, $70_{B1}$ is type 2 link 5 that can be connected such that first surface 5F becomes concave. The outside (right side) of each of boundary lines $70_{B1}$, $70_{B2}$, $70_{B3}$ is type 1 link 5 that can be connected such that second surface 5R becomes concave.

In cable guide 4, the shape (bent or straight) of cable guide 4 when viewed from the side can be made to be the intended shape by determining the connection angle range of link 5 appropriately. The term "viewed from the side" means that cable guide 4 is viewed from the side facing the side surface of cable guide 4. Cable guide 4 can take the shape shown in FIGS. 3, 10, and 11 by disposing and connecting type 1 links 5 and type 2 links 5 as illustrated in FIG. 23. In cable guide 4, determining in which portion in all links 5 type 1 link 5 is disposed and determining in which portion in all links 5 type 2 link 5 is disposed determine the connection angle range of each link 5 included in cable guide 4.

Cable guide $4_{A2}$ is disposed such that first surface 5F of cable guide $4_{A2}$ faces second surface 5R of cable guide $4_{A1}$. Cable guide $4_{A3}$ is disposed such that first surface 5F of cable guide $4_{A3}$ faces second surface 5R of cable guide $4_{A2}$. Cable guide $4_{B2}$ is disposed such that first surface 5F of cable guide $4_{B2}$ faces second surface 5R of cable guide $4_{B1}$. Cable guide $4_{B3}$ is disposed such that first surface 5F of cable guide $4_{B3}$ faces second surface 5R of cable guide $4_{B2}$. Cable guide $4_{A3}$ and cable guide $4_{B3}$ are suspended such that second surfaces 5R of Cable guide $4_{A3}$ and cable guide $4_{B3}$ face each other at a portion close to guide end connection 8.

Figure 24:
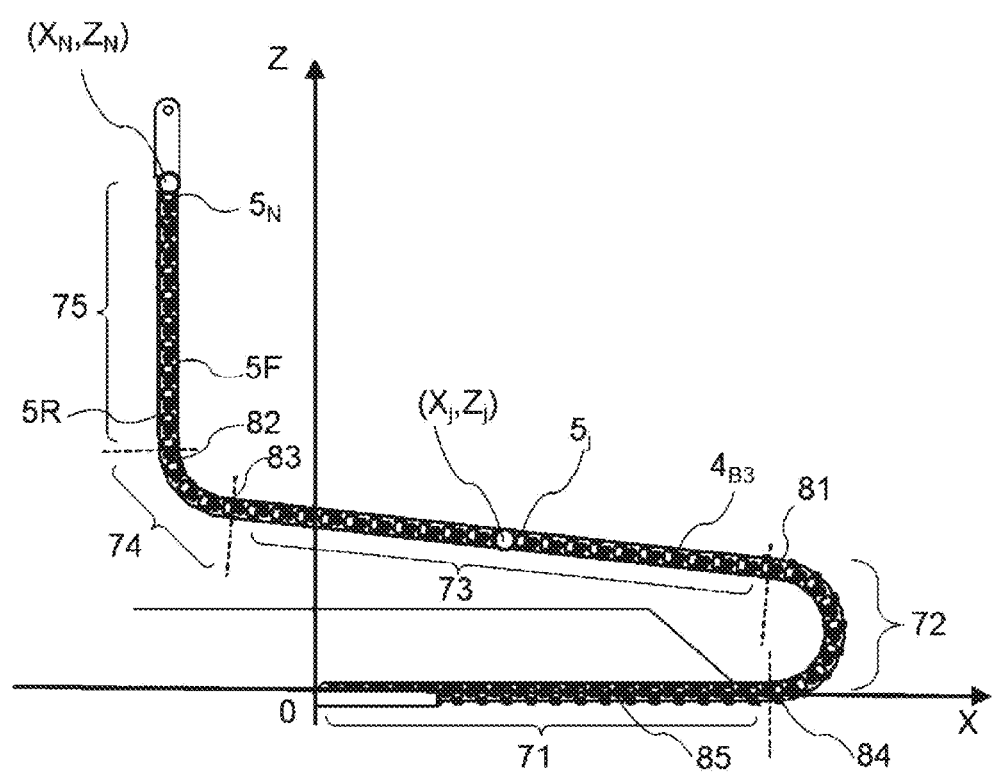
FIG. 24 is a front view illustrating ranges to which the links classified by force acting on the link belong in the cable guide included in the suspending device of Embodiment 1.

Referring to FIG. 24, why the shape shown in FIG. 3 is obtained is described while cable guide $4_{B3}$ is used as an example. FIG. 24 is a front view illustrating the ranges to which links 5 classified by force acting on link 5 belong in cable guide 4. FIG. 24 also illustrates an XZ coordinate system.

When viewed from the side (Y-axis direction), cable guide 4 has a shape in which a fixed-side linear portion 71, a first bent portion 72, an intermediate linear portion 73, a second bent portion 74, and a suspending portion 75 from the side closer to fixed-side member 1. Each of fixed-side linear portion 71, first bent portion 72, intermediate linear portion 73, second bent portion 74, and suspending portion 75 is a single link 5 or a plurality of links 5 being disposed consecutively. Whether each link 5 becomes fixed-side linear portion 71, first bent portion 72, intermediate linear portion 73, second bent portion 74, or a suspending portion 75 is determined depending on the position of movable-side member 2. Furthermore, a spatial position of each link 5 is changed according to a spatial position of movable-side member 2.

Suspending portion 75 includes a part of the plurality of links 5 that hang downward from movable-side member 2. Second bent portion 74 is one or a plurality of links 5 that are connected below suspending portion 75 and bent and connected such that first surface 5F becomes concave. Intermediate linear portion 73 includes a part of the plurality of links 5 connected linearly when viewed from the side below second bent portion 74. Intermediate linear portion 73 is a portion in which a plurality of Type 1 links 5, which can be connected such that second surface 5R becomes concave or such that first surface 5F becomes linear, are connected linearly. First bent portion 72 includes a part of the plurality of links 5 that are connected below intermediate linear portion 73 and bent and connected such that second surface 5R becomes concave. Fixed-side linear portion 71 includes a part of the plurality of links 5 that are connected to the lower end of first bent portion 72 and extends horizontally toward the center. Fixed-side linear portion 71 is connected to fixed-side member 1. Intermediate linear portion 73 exists at a portion closer to the cable end connection 8 than first bent portion 72. Second bent portion 74 is one or the plurality of links 5 connecting suspending portion 75 and intermediate linear portion 73.

N is defined as the number of links 5 constituting cable guide 4. N is a value determined by each cable guide 4. For N links 5, links $5_1, 5_2, \ldots, 5_{j-1}, 5_j, \ldots, 5_N$ are numbered in order from the side of fixed-side member 1. The end connected to fixed-side member 1 of link 51 is defined as an origin of the XZ coordinates. The X-axis is the axis in the direction in which cable guide 4 extends in the horizontal direction. The Z axis is the axis in the direction perpendicular to the horizontal plane. The point where link $5_j$ is connected to link $5_{j-1}$ is defined as the position of link $5_j$. The position of link $5_j$ is represented by $(X_j, Z_j)$.

When a position $(X_N, Z_N)$ of link $5_N$ connected to movable-side member 2 is determined, cable guide 4 has the shape that minimizes a sum of potential energies of all links $5_j$. When the sum of potential energies is expressed by a variable Esum, variable Esum can be calculated by the following equation. The potential energy expresses assuming that the potential energy of link 51 is zero.

$$E \text{ sum} = \Sigma(Z_j) \tag{1}$$

where, $\Sigma$ represents the sum of values for j=1 to N.

An equation $X_j = X_N$ is satisfied because link $5_j$ belonging to suspending portion 75 hangs vertically. The greater the number of links $5_j$ belonging to suspending portion 75, the lower the height of links $5_j$ belonging to second bent portion 74 and the like. For this reason, when Esum is minimized, the number of links $5_j$ belonging to suspending portion 75 is as large as possible.

In link $5_j$ belonging to fixed-side linear portion 71, an equation $Z_j = 0$ is satisfied, because link $5_j$ belonging to fixed-side linear portion extends at the same height as link $5_1$ extends horizontally. The greater the number of links $5_j$ belonging to fixed-side linear portion 71, the smaller the number of links 5 having greater potential energy than link $5_1$. For this reason, when Esum is minimized, the number of links $5_j$ belonging to fixed-side linear portion 71 becomes as large as possible.

When the number of links $5_j$ belonging to suspending portion 75 and the fixed-side linear portion 71 is maximized, the number of links 5 belonging to other portions (second bent portion 74, intermediate linear portion 73, first bent portion 72) is minimized. As a result, second bent portion 74, intermediate linear portion 73, and first bent portion 72 have the shape that connects suspending portion 75 and fixed-side linear portion 71 in the shortest path. That is, in second bent portion 74 and first bent portion 72, link 5 is bent and connected with the maximum allowable curvature. Links 5 are connected linearly in intermediate linear portion 73.

In intermediate linear portion 73, type 1 links 5 are connected such that first surface 5F becomes linear. Second bent portion 74 and suspending portion 75 are type 2 links 5. For this reason, the boundary between intermediate linear portion 73 and second bent portion 74 is a boundary 70 between type 1 link 5 and type 2 link 5. While the number of links 5 belonging to suspending portion 75 that hangs vertically becomes maximum, second bent portion 74 is bent such that first surface 5F becomes concave. In second bent portion 74, links 5 are connected to bend from the vertical direction to the direction in which intermediate linear portion 73 extends.

Intermediate linear portion 73, first bent portion 72, and fixed-side linear portion 71 are type 1 link 5. Fixed-side linear portion 71 extends in the direction away from cable guide connection 7 such that the number of links 5 belonging to fixed-side linear portion 71 is maximized. First bent portion 72 is bent at the maximum allowable curvature and is connected to intermediate linear portion 73. Intermediate linear portion 73 connects first bent portion 72 and second bent portion 74 in the straight line.

A first inflection point link 81, a second inflection point link 82, a third inflection point link 83, a fourth inflection point link 84, and a lowest point link 85 are used to represent the shape of cable guide 4. FIG. 24 illustrates first inflection point link 81, second inflection point link 82, third inflection point link 83, fourth inflection point link 84, and lowest point link 85. First inflection point link 81 is link 5 that belongs to first bent portion 72 and is adjacent to intermediate linear portion 73. Second inflection point link 82 is link 5 that belongs to second bent portion 74 and is adjacent to suspending portion 75. Third inflection point link 83 is link 5 that belongs to second bent portion 74 and is adjacent to intermediate linear portion 73. Third inflection point link 83 is type 2 link 5 adjacent to type 1 link 5. Fourth inflection point link 84 is a link 5 that belongs to first bent portion 72 and is adjacent to fixed-side linear portion 71. Lowest point link 85 is link 5 being present at the lowest position in the fixed-side linear portion 71. Link 5 that becomes third inflection point link 83 is always the same link 5 even when the shape of cable guide 4 is changed. Link 5 that becomes each of first inflection point link 81, second inflection point link 82, fourth inflection point link 84, and lowest point link 85 is changed according to the change of the shape of cable guide 4, when movable-side member 2 moves and the shape of cable guide 4 is changed.

First inflection point link 81, second inflection point link 82, third inflection point link 83, fourth inflection point link 84, and lowest point link 85 are also referred to as the first inflection point frame body, the second inflection point frame body, the third inflection point frame body, the fourth inflection point frame body, and the lowest point frame body, respectively.

The range of link 5 belonging to intermediate linear portion 73 is determined by which position of link 5 in all links 5 included in cable guide 4 becomes first inflection point link 81. The range of link 5 belonging to first bent portion 72 is determined by the positions of first inflection point link 81 and fourth inflection point link 84 in all links 5. The range of link 5 belonging to second bent portion 74 is determined by the position of second inflection point link 82 in all links 5. The range of link 5 belonging to fixed-side linear portion 71 is determined by the position of fourth inflection point link 84 in all links 5. The range of link 5 belonging to suspending portion 75 is determined by the position of second inflection point link 82 in all links 5.

The shapes of cable guides $4_{A1}$, $4_{A2}$, $4_{A3}$ and the shapes of cable guides $4_{B1}$, $4_{B2}$, $4_{B3}$ are the same as the movement of movable-side member 2 in which the locus is symmetrical when viewed from the side except that only the left and right sides are different. Accordingly, in the following, cable guides $4_{A1}$, $4_{A2}$, $4_{A3}$ is described as an example.

At first bent portion 72, links 5 are bent in an arc shape. The direction in which intermediate linear portion 73 extends is changed, when the position of movable-side member 2 is changed. The number of links 5 belonging to first bent portion 72 is changed, when the direction in which intermediate linear portion 73 extends is changed. When cable guide 4 shown in FIG. 3 is bent to form nearly a semicircle, the number of links 5 belonging to first bent portion 72 increases. In cable guide $4_{A1}$ having the smaller maximum absolute value of the curvature, the number of links 5 belonging to first bent portion 72 is larger than that of cable guides $4_{A2}$, $4_{A3}$ having the larger maximum absolute value of the curvature. When the cable is bent at an angle of about 110 degrees in an arc shape like cable guides $4_{A1}$, $4_{A2}$, $4_{A3}$ shown in FIG. 11, the number of links 5 belonging to first bent portion 72 is decreased as compared with the case shown in FIG. 3 in which the cable is bent to form nearly a semicircle.

The range of links 5 belonging to first bent portion 72 in all links 5 is changed depending on the position of movable-side member 2. When movable-side member 2 is located at a relatively low position on the upper center of fixed-side member 1 like cable guides $4_{A1}$, $4_{A2}$, $4_{A3}$ shown in FIG. 3, or when movable-side member 2 is located at a relatively high position on the upper left of fixed-side member 1 than cable guide connection 7 like cable guides $4_{A1}$, $4_{A2}$, $4_{A3}$ shown in FIG. 11, the difference in the numbers of links 5 belonging to fixed-side linear portion 71 and intermediate linear portion 73 is small, and link 5 belonging to first bent portion 72 is located near the center of type 1 link 5. The spatial positions of first inflection point link 81 and fourth inflection point link 84 are positions where the horizontal distances from cable guide connection 7 are large.

The number of links 5 included in each of cable guides $4_{A1}$, $4_{A2}$, $4_{A3}$ is determined such that suspending portion 75 hangs vertically at each cable guide $4_{A1}$, $4_{A2}$, $4_{A3}$ and such that the horizontal position of first inflection point link 81 is separated from adjacent cable guides $4_{A1}$, $4_{A2}$, $4_{A3}$ with a distance greater than or equal to a determined horizontal separation distance. For example, when the difference in the number of links 5 of cable guides $4_{A1}$, $4_{A2}$ is smaller than an appropriate value, the difference in the horizontal positions of the cable guides $4_{A1}$, $4_{A2}$ becomes smaller than the horizontal separation distance.

Like cable guides $4_{A1}$, $4_{A2}$, $4_{A3}$ shown in FIG. 10, when movable-side member 2 is located at a relatively high position on the side opposite to cable guide connection 7 with respect to the center of fixed-side member 1, the number of links 5 belonging to intermediate linear portion 73 increases, and the number of links 5 belonging to fixed-side linear portion 71 decreases. As a result, the range of link 5 belonging to first bent portion 72 is moved to the portion close to cable guide connection 7. The spatial positions of first inflection point link 81 and fourth inflection point link 84 are the position where the horizontal distances from cable guide connection 7 become small.

The difference in the height between first inflection point link 81 and fourth inflection point link 84 is determined according to the curvature at first bent portion 72. In each of cable guides $4_{A1}$, $4_{A2}$, $4_{A3}$, the curvature at first bent portion 72 is determined appropriately such that the difference in the height between first inflection point link 81 and fourth inflection point link 84 becomes greater than or equal to a determined first height at each position where movable-side member 2 moves. The first height is the lower limit of the height of first bent portion 72. When the decrease of the height of fixed linear portion 71 is not occurred, the height of fourth inflection point link 84 is the same as the height of cable guide connection 7. At each position including the cases shown in FIGS. 3, 10, and 11 where movable-side member 2 moves, the curvature at first bent portion 72 and the height difference of cable guide connection 7 by adjacent two cable guides 4 are determined such that the height distance of first inflection point link 81 becomes greater than or equal to a determined separation height at adjacent two cable guides 4. Two adjacent cable guides 4 are either cable guides $4_{A1}$, $4_{A2}$ or cable guides $4_{A2}$, $4_{A3}$ or cable guides $4_{B1}$, $4_{B2}$ or cable guides $4_{B2}$, $4_{B3}$ in the suspending device 90.

Type 1 link 5 is divided into 6 kinds by whether or not becoming each of intermediate linear portion 73, first bent portion 72, and fixed-side linear portion 71, depending on the position of movable-side member 2. The six kinds are a kind A, a kind B, a kind C, a kind D, a kind E, and a kind F. Link 5 of kind A is link 5 that is always fixed-side linear portion 71 regardless of the position of movable-side member 2. Link 5 of kind B is link 5 that becomes fixed-side linear portion 71 or first bent portion 72 depending on the position of movable-side member 2. Link 5 of kind C is link 5 that is always first bent portion 72 regardless of the position of movable-side member 2. The link of kind D is link 5 that becomes fixed-side linear portion 71, first bent portion 72, or intermediate linear portion 73 depending on the position of movable-side member 2 that moves. Cable guide 4 includes the link of kind D link, but does not include link 5 of kind C. Cable guides including the link of kind C do not include links 5 of kind D. The link of kind E is link 5 that becomes first bent portion 72 or intermediate linear portion 73 depending on the position of movable-side member 2. Link 5 of kind F is link 5 that is always intermediate linear portion 73 regardless of the position of movable-side member 2.

In cable guide 4, links 5 of kind A, kind B, kind C or kind D, kind E, and kind F exist sequentially from the side near cable guide connection 7. Links 5 that become fixed-side linear portion 71 are links 5 of kind A, a kind B, and kind D. Links 5 that become first bent portion 72 are links 5 of kind B, kind C, kind D, and kind E. Links 5 that become intermediate linear portion 73 are links 5 of kind D, kind E, and kind F. The cable guide includes either link 5 of kind C or link 5 of kind D. Sometimes the cable guide does not include the link of at least one kind of kind A and kind F depending on the positional relationship between the fixed-side member and the movable-side member, the range in which the movable-side member moves, and the like. Sometimes links 5 of both of kind C and kind D are not included.

The number of links 5 belonging to second bent portion 74 is changed according to the angle formed by the extending direction and the vertical direction of intermediate linear portion 73. As illustrated in FIG. 3, when second bent portion 74 is bent to nearly 90 degrees like cable guide 4, the number of links 5 belonging to second bent portion 74 increases. When cable guides $4_{A1}$, $4_{A2}$, $4_{A3}$ shown in FIG. 11 are bent in an arc shape at an angle of about 20 degrees, the number of links 5 belonging to second bent portion 74 is smaller than in the case shown in FIG. 3. When the bent angle at second bent portion 74 is the same, in cable guide $4_{A1}$ having the smaller maximum absolute value of the curvature, the number of link 5 belonging to second bent portion 74 is larger than those in cable guides $4_{A2}$, $4_{A3}$ having the larger maximum absolute value of the curvature.

Since the number of type 2 links 5 is fixed, the larger the number of links 5 belonging to second bent portion 74, the smaller the number of links 5 belonging to suspending portion 75. When the number of links 5 belonging to suspending portion 75 is small, the spatial position of second inflection point link 82 becomes a position close to guide end connection 8. When the number of links 5 belonging to second bent portion 74 decreases, the number of links 5 belonging to suspending portion 75 increases. When the number of links 5 belonging to suspending portion 75 is large, the spatial position of second inflection point link 82 becomes a position far from guide end connection 8. In each cable guide 4, the number of type 2 links 5 is determined such that the difference in the height between second inflection point link 82 and guide end connection 8 is greater than or equal to a determined suspension height at each position where movable-side member 2 moves. Type 2 link 5 cannot be intermediate linear portion 73. Conversely, type 1 link 5 cannot be second bent portion 74.

Although the number of links 5 belonging to second bent portion 74 varies, the number of type 2 links 5 determines the position where second inflection point link 82 is the lowest. The position where second inflection point link 82 becomes the lowest is the position where the number of links 5 belonging to suspending portion 75 is the maximum and where the length of suspending portion 75 is the longest. The position where second inflection point link 82 becomes the lowest is referred to as a longest suspending position. The difference between the height of the longest suspending position of each cable guide $4_{A1}$, $4_{A2}$, $4_{A3}$ and the height of the longest suspending position of the adjacent cable guide 4 is determined to be a value being greater than or equal to a determined second height. By determining in such a way, at each position where movable-side member 2 moves, the height difference of second inflection point links 82 of adjacent two cable guides 4 can be set to greater than or equal to the second height. The reason is that when the bent angle at second bent portion 74 is the same, cable guide 4 having the smaller maximum absolute value of the curvature has a larger number of links 5 belonging to second bent portion 74 and the number of vertically-suspended links 5 belonging to suspending portion 75 is decreased. That is, the higher the height of the longest suspending position and the smaller the maximum value of the absolute value of the curvature of cable guide 4, the larger the amount of the height increase in the position of second inflection point link 82 rising from the longest suspending position. Accordingly, when the height difference of the longest suspending position is greater than or equal to the second height, the difference in the height of second inflection point link 82 of two adjacent cable guides 4 becomes greater than or equal to the second height at each position where movable-side member 2 moves.

The number of links 5 included in each cable guide 4 is determined to be greater than or equal to the number required for suspending portion 75 to hang vertically at each position where movable-side member 2 moves such that suspending portion 75 hangs vertically even at the position where movable-side member 2 is farthest from cable guide connection 7. When suspending portion 75 hangs vertically even at the position where movable-side member 2 is farthest from cable guide connection 7, suspending portion 75 hangs vertically at each position where movable-side member 2 moves. When the number of links 5 included in cable guide 4 is small, links 5 between movable-side connection 8 and first bent portion 72 are connected in the linear shape or a polygonal line in which suspending portion 75 is inclined at the position where movable-side member 2 is the farthest from cable guide connection 7. The number of links 5 included in cable guide 4 is also called a total number of links 5.

Type 2 link 5 is divided into three kinds by becoming whether or not each of second bent portion 74 and suspending portion 75 depending on the position where movable-side member 2 is present. The three kinds are kind G, kind H, and kind J. Link 5 of kind G is link 5 that is always second bent portion 74 regardless of the position of movable-side member 2. Link 5 of kind H is link 5 that becomes second bent portion 74 or suspending portion 75 depending on the position of movable-side member 2. The link of kind J is link 5 that is always suspending portion 75 regardless of the position of movable-side member 2.

Links 5 of kind J, kind H, and kind G exist in order from the side close to movable-side member 2. The link 5 that becomes the suspending portion 75 is a kind J and a kind H link 5. The link 5 that becomes the second bent portion 74 is the link 5 of the kind H and the kind G. Depending on the way how the link connection angle range is determined, the cable guide may not have a kind H link.

Lowest point link 85 is link 5 being present at the lowest position in the fixed-side linear portion 71. When links 5 are connected linearly in fixed-side linear portion 71, the height of lowest point link 85 is the same as the height of cable guide connection 7. When the absolute value of the curvature at which second surface 5R at fixed-side linear portion 71 becomes concave increases, the position of lowest point link 85 becomes lower. The curvature at fixed-side linear portion 71 is determined such that the value obtained by subtracting the height of cable guide connection 7 from the height of lowest point link 85 is greater than or equal to a decrease allowable value. The decrease allowable value is set to an appropriate value less than or equal to zero.

Figure 25:
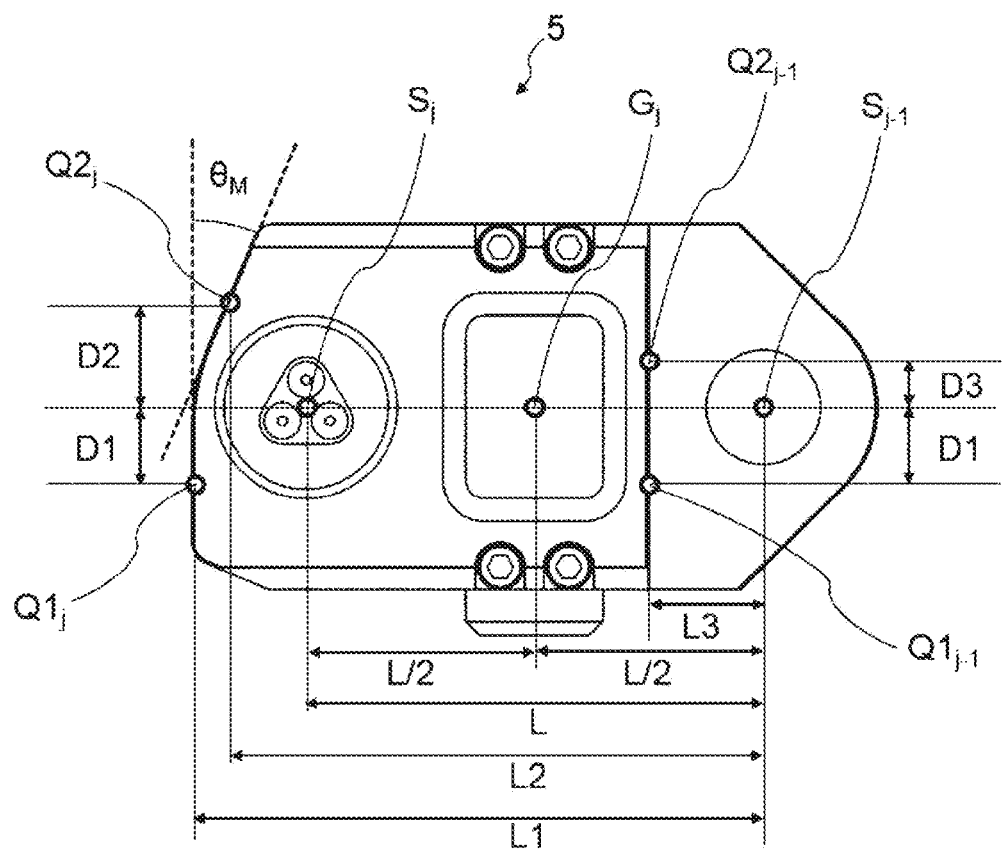
FIG. 25 is a front view illustrating a variable representing a dimension and the like of the link included in the suspending device of Embodiment 1.
Figure 26:
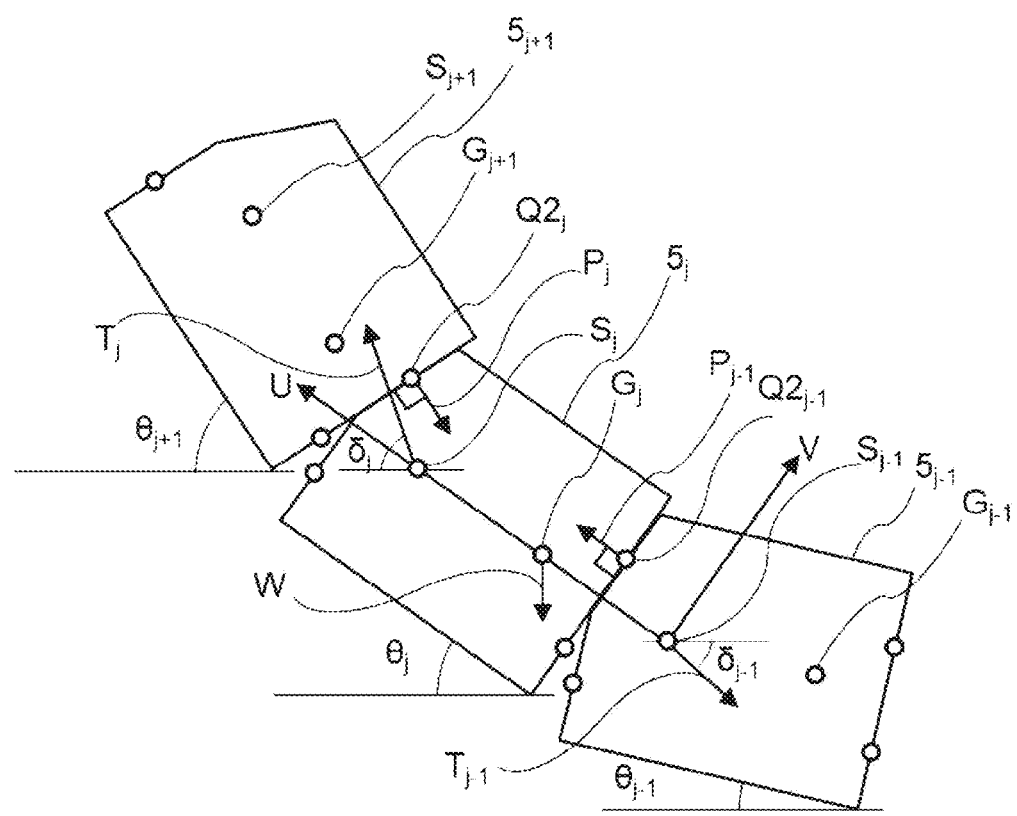
FIG. 26 is a front view illustrating the variable representing the force acting on the link included in the suspending device of Embodiment 1.

Referring to FIGS. 25 and 26, the force acting on link 5 is described. FIG. 25 is a front view illustrating variables representing the dimensions of link 5 and the like. FIG. 26 is a front view illustrating a variable representing the force acting on link 5. A UV coordinate system having the direction in which link $5_j$ extends as a reference is defined. A U-axis is an axis parallel to the direction in which link $5_j$ extends. A V-axis is an axis perpendicular to the U-axis. The U-axis is defined to pass through the point at which link $5_j$ is connected to adjacent links $5_{j+i}$, $5_{j-1}$ and the center of gravity of link $5_j$. The origin of the UV coordinate system is defined to the point at which link $5_j$ is connected to link $5_{j-1}$. The positive direction of the U-axis is defined as the direction from the origin to the point at which link $5_j$ is connected to link $5_{j+1}$. The positive direction of the V-axis is the direction from the origin to first surface 5F.

The following variables are defined.

N: Number of links 5

$(X_N, Z_N)$: position of Nth link 5, given as a boundary condition.

L: Length of one link

θj: Angle formed between directions of link $5_j$ and X-axis

W: Weight of link 5

Wu: u component of gravity W. Wu=W*sin(θj)

Wv: v component of gravity W. Wv=W*cos(θj)

Tj: Tension acting between link $5_j$ and link $5_{j-1}$

δj: Angle formed between directions of tension Tj and X-axis

Tuj: u component of Tj. Tuj=$T_j$*cos(δj−θj)

Tvj: v component of Tj. Tvj=$T_j$*sin(δj−θj)

$G_j$: Center of gravity of link $5_j$ $S_j$: Action point of tension Tj acting on link $5_j$ $S_{j-1}$ is origin of UV coordinate system Pj: Pushing force acting between link $5_j$ and link $5_{j+1}$. The pushing force acts perpendicular to the contact surface.

θM: Upper limit of the connection angle formed between link $5_j$ and adjacent links $5_{j+1}$, $5_{j-1}$ $Q1_j$: Action point of pushing force when link $5_j$ and link $5_{j+1}$ are connected linearly $Q2_j$: Action point of pushing force when link $5_j$ and link $5_{j+1}$ are connected at angle θM $Q1_{j-1}$: Action point of pushing force when link $5_j$ and link $5_{j-1}$ are connected linearly $Q2_{j-1}$: Action point of pushing force when link $5_j$ and link $5_{j-1}$ are connected at angle θM (L1, −D1): Coordinates of $Q1_j$ in UV coordinate system (L2, D2): Coordinates of $Q2_j$ in UV coordinate system (L3, −D1): Coordinates of $Q1_{j-1}$ in UV coordinate system (L3, D3): Coordinates of $Q2_{j-1}$ in UV coordinate system LM: Proportional coefficient between rotation moment due to pushing force Pj acting on $Q2_j$ and pushing force Pj $$LM = L2*\cos(\theta M) - D2*\sin(\theta M)$$

The position of link $5_j$ can be expressed as follows by an angle θj.

$$Xj = L*\Sigma \cos(\theta k) \quad (2)$$

$$Zj = L*\Sigma \sin(\theta k) \quad (3)$$

where, Σ means to take the sum of values for k=1, . . . , j.

In addition, as a boundary condition, the following equations must be satisfied.

$$X_N = L*\Sigma \cos(\theta k) \quad (4)$$

$$Z_N = L*\Sigma \sin(\theta k) \quad (5)$$

where, Σ means to take the sum of values for k=1, . . . , N.

When equation (3) is substituted into equation (1), the following equation is obtained.

$$E \text{ sum} = L*\Sigma((N+1-j)*\sin(\theta j)) \quad (6)$$

where, Σ means to take the sum of values for j=1, . . . , N.

From equation (6), it can be seen that reducing angle θj of link $5_j$ being present near fixed-side member 1 is effective in reducing Esum.

The relational expressions between tensions $T_j$, $T_{j-1}$ and the pushing forces $P_j$, $P_{j-1}$ acting on link 53 is described below for each case.

(1) In the case where the pressing force does not act on link $5_j$

From the balance of force, the following equations are satisfied.

$$Tu_j = Tu_{j-1} + Wu \quad (7)$$

$$Tv_j = Tv_{j-1} + Wv \quad (8)$$

From the balance of the rotational moments around $S_{j-1}$, the following equation is satisfied.

$$L*Tv_j = (L/2)*Wv$$

$$Tv_j = Wv/2 \quad (9)$$

When equation (9) is substituted into equation (8), the following equation is obtained.

$$Tv_{j-1} = -Wv/2 \quad (10)$$

Because W is a fixed value, Wu and Wv are determined when angle θj of link $5_j$ is determined, and $Tv_j$ and $Tv_{j-1}$ are determined by equations (9), (10). In addition, $Tu_{j-1}$ can be determined from known $Tu_j$ by equation (7). Alternatively, $Tu_j$ can be determined from known $Tu_{j-1}$.

(2) In the case where pushing force acts on link $5_j$ from both sides (2A) In the case where links $5_{j+1}$, $5_j$, $5_{j-1}$ are arranged linearly and $Q1_j$ is higher than the center of gravity $G_j$ Because links $5_j$ are arranged linearly, the following equations are satisfied for the angles of links 5.

$$\theta_{j+1} = \theta_j \quad (11)$$

$$\theta_j = \theta_{j-1} \quad (12)$$

Equations (11), (12) are also satisfied when $Q1_j$ is lower than the center of gravity $G_j$.

From the balance of force, the following equations are satisfied. However, it must be $P_j>0$ and $P_{j-1}>0$.

$$Tu_j - P_j = Tu_{j-1} - P_{j-1} + Wu \quad (13)$$

$$Tv_j = Tv_{j-1} + Wv \quad (14)$$

From the balance of the rotational moments around $S_{j-1}$, the following equation is satisfied.

$$L*Tv_j + D1*P_j = (L/2)*Wv + D1*P_{j-1}$$

$$Tv_j + (D1/L)*P_j = (Wv/2) + (D1/L)*P_{j-1} \quad (15)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$, $P_{j-1}$ by equations (13) to (15). Alternatively, $Tu_{j-1}$, $Tv_{j-1}$, $P_{j-1}$ can be calculated from known $Tu_j$, $Tv_j$, $P_j$.

(2B) In the case where links $5_{j+1}$, $5_j$, $5_{j-1}$ are arranged linearly and $Q1_j$ is lower than the center of gravity $G_j$ The force balance equations are equations (13), (14).

From the balance of the rotational moments around $S_{j-1}$, the following equation is satisfied.

$$Tv_j - (D1/L)*P_j = (Wv/2) + (D1/L)*P_{j-1} \quad (16)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$, $P_{j-1}$ by equations (13), (14), (16). Alternatively, $Tu_{j-1}$, $Tv_{j-1}$, $P_{j-1}$ can be calculated from known $Tu_j$, $Tv_j$, $P_j$.

(2C) In the case where links $5_j$ are bent and $Q2_j$ is higher than the center of gravity $G_j$ Because links $5_{j+1}$, $5_j$, $5_{j-1}$ are bent, the following equations are satisfied for the angles of links 5.

$$\theta_{j+1} = \theta_j + \theta M \quad (17)$$

$$\theta_j = \theta_{j-1} + \theta M \quad (18)$$

Equations (17), (18) are also satisfied when $Q2_j$ is lower than the center of gravity $G_j$.

From the balance of force, the following equations are satisfied. However, it must be $P_j>0$ and $P_{j-1}>0$.

$$Tu_j - P_j*\sin(\theta M) = Tu_{j-1} - P_{j-1} + Wu \quad (19)$$

$$Tv_j - P_j*\cos(\theta M) = Tv_{j-1} + Wv \quad (20)$$

From the balance of the rotational moments around $S_{j-1}$, the following equation is satisfied.

$$Tv_j - (LM/L)*P_j = (Wv/2) + (D3/L)*P_{j-1} \quad (21)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$, $P_{j-1}$ by equations (19) to (21). Alternatively, $Tu_{j-1}$, $Tv_{j-1}$, $P_{j-1}$ can be calculated from known $Tu_j$, $Tv_j$, $P_j$.

(2D) In the case where links $5_j$ are bent and $Q2_j$ is lower than the center of gravity $G_j$ The force balance equations are equations (19), (20).

From the balance of the rotational moments around $S_{j-1}$, the following equation is satisfied.

$$Tv_j + (LM/L)*P_j = (Wv/2) - (D3/L)*P_{j-1} \quad (22)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$, $P_{j-1}$ by equations (19), (20), (22). Alternatively, $Tu_{j-1}$, $Tv_{j-1}$, $P_{j-1}$ can be calculated from known $Tu_j$, $Tv_j$, $P_j$.

(3) In the case where the pushing force acts on link $5_j$ only from the link $5_{j+1}$ (3A) In the case where links $5_{j+1}$, $5_j$ are arranged linearly and $Q1_j$ is higher than the center of gravity $G_j$ Equation (11) is satisfied for the angle of link 5.

From the balance of force, the following equations are satisfied. However, $P_j>0$ must be satisfied.

$$Tu_j - P_j = Tu_{j-1} + Wu \quad (23)$$

$$Tv_j = Tv_{j-1} + Wv \quad (24)$$

From the balance of the rotational moments around $S_{j-1}$, the following equation is satisfied.

$$Tv_j + (D1/L)*P_j = (Wv/2) \quad (25)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$ by equations (23) to (25).

(3AB) In the case where links $5_{j+1}$, $5_j$ are arranged linearly and $Q1_j$ is lower than the center of gravity $G_j$ Equation (11) is satisfied for the angle of link 5. The force balance equations are equations (23), (24).

From the balance of the rotational moments around $S_{j-1}$, the following equation is satisfied.

$$Tv_j \times (D1/L)*P_j = (Wv/2) \quad (26)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$ by equations (23), (24), (26).

(3C) In the case where links $5_{j+1}$, $5_j$ are bent and $Q2_j$ is higher than the center of gravity $G_j$ Because links $5_{j+1}$, $5_j$ are bent, equation (17) is satisfied for the angle of link 5.

From the balance of force, the following equations are satisfied. However, $P_j>0$ must be satisfied.

$$Tu_j - P_j*\sin(\theta M) = Tu_{j-1} + Wu \quad (27)$$

$$Tv_j - P_j*\cos(\theta M) = Tv_{j-1} + Wv \quad (28)$$

From the balance of the rotational moments around $S_{j-1}$, the following equation is satisfied.

$$Tv_j - (LM/L)*P_j = (Wv/2) \quad (29)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$ by equations (27) to (29).

(3D) In the case where links $5_{j+1}$, $5_j$ are bent and $Q2_j$ is lower than the center of gravity $G_j$ Equation (17) is satisfied for the angle of link 5. Equations (27), (28) are satisfied from the balance of force.

From the balance of the rotational moments around $S_{j-1}$, the following equation is satisfied.

$$Tv_j + (LM/L)*P_j = (Wv/2) \quad (30)$$

When angle $\theta j$ of link $5_j$ is determined, Wu and Wv are determined, and $Tu_j$, $Tv_j$, $P_j$ can be calculated from known $Tu_{j-1}$, $Tv_{j-1}$ by equations (27), (28), (30).

(4) In the case where the pushing force acts on link $5_j$ only from the link $5_{j-1}$ (4A) In the case where links $5_j$, $5_{j-1}$ are arranged linearly and $Q1_j$ is higher than the center of gravity $G_j$ Equation (12) is satisfied for the angle of link 5.

From the balance of force, the following equations are satisfied. However, $P_{j-1}>0$ must be satisfied.

$$Tu_j = Tu_{j-1} - P_{j-1} + Wu \quad (31)$$

$$Tv_j = Tv_{j-1} + Wv \quad (32)$$

From the balance of the rotational moments around $S_{j-1}$, the following equation is satisfied.

$$Tv_j = (Wv/2) + (D1/L)*P_{j-1} \qquad (33)$$

When angle θj of link 53 is determined, Wu and Wv are determined, and $Tu_{j-1}$, $Tv_{j-1}$, $P_{j-1}$ can be calculated from known $Tu_j$, $Tv_j$ by equations (31) to (33).

(4B) In the case where links $5_j$, $5_{j-1}$ are arranged linearly and $Q1_j$ is lower than the center of gravity $G_j$ Equation (12) is satisfied for the angle of link 5. The force balance equations are equations (31), (32).

From the balance of the rotational moments around $S_{j-1}$, the following equation is satisfied.

$$Tv_j - (D1/L)*P_j = (Wv/2) \qquad (34)$$

When angle θj of link 53 is determined, Wu and Wv are determined, and $Tu_{j-1}$, $Tv_{j-1}$, $P_{j-1}$ can be calculated from known $Tu_j$, $Tv_j$ by equations (31), (32), (34).

(4C) In the case where links $5_j$, $5_{j-1}$ are bent and $Q2_j$ is higher than the center of gravity $G_j$ Because links $5_j$, $5_{j-1}$ are bent, equation (18) is satisfied for the angle of link 5.

From the balance of force, the following equations are satisfied. However, $P_{j-1} > 0$ must be satisfied.

$$Tu_j = Tu_{j-1} - P_{j-1} + Wu \qquad (35)$$

$$Tv_j = Tv_{j-1} + Wv \qquad (36)$$

From the balance of the rotational moments around $S_{j-1}$, the following equation is satisfied.

$$Tv_j = (Wv/2) + (D3/L)*P_{j-1} \qquad (37)$$

When angle θj of link $5_j$ is determined, Wu and Wv are determined, and $Tu_{j-1}$, $Tv_{j-1}$, $P_{j-1}$ can be calculated from known $Tu_j$, $Tv_j$ by equations (35) to (37).

(4D) In the case where links $5_j$, $5_{j-1}$ are bent and $Q2_j$ is higher than the center of gravity $G_j$ Equation (18) is satisfied for the angle of link 5. Equations (35), (36) are satisfied from the balance of force.

From the balance of the rotational moments around $S_{j-1}$, the following equation is satisfied.

$$Tv_j = (Wv/2) - (D3/L)*P_{j-1} \qquad (38)$$

When angle θj of link $5_j$ is determined, Wu and Wv are determined, and $Tu_{j-1}$, $Tv_{j-1}$, $P_{j-1}$ can be calculated from known $Tu_j$, $Tv_j$ by equations (35), (36), (38).

As described above, the equations that are satisfied between the tensions $T_j$, $T_{j-1}$ and the pushing force $P_j$, $P_{j-1}$ acting on link $5_j$ are illustrated when angle θj of link $5_j$ is set to the designated value. Angle θj can be determined such that the boundary conditions illustrated in these relational expressions and equations (4), (5) are satisfied and such that Esum that is the sum of the potential energies is minimized.

Pushing force $P_j$ and tension $T_j$ acting on link 5 on which the pushing force acting between links 5 acts can be calculated from tension $T_j$ acting on link 5 on which the pushing force does not act. When the links 5 on which pushing force $P_j$ acting between links 5 acts are arranged in succession, the relational expression can be derived between tensions $T_j$ acting on the two links 5 that are arranged at both ends of links 5 being acted with the pushing force acting between links 5 and on which pushing force $P_j$ does not act. This is equivalent to treating the plurality of links 5 on which pushing force $P_j$ acts as one rigid body.

The shape of cable guide 4 can be calculated with the smaller number of variables by treating suspending portion 75, second bent portion 74, intermediate linear portion 73, first bent portion 72, and fixed-side linear portion 71 as one or two rigid bodies. Because links 5 are connected vertically, suspending portion 75 is treated as one rigid body. In link 5 (second inflection point link 82) adjacent to suspending portion 75 of links 5 belonging to second bent portion 74, the connection angle with link 5 belonging to suspending portion 75 does not always be θM. For this reason, in second bent portion 74, second inflection point link 82 is treated as one rigid body, and remaining links 5 are treated as one rigid body. Similarly, in intermediate linear portion 73, link 5 adjacent to first bent portion 72 is treated as one rigid body, and remaining links 5 are treated as one rigid body. In first bent portion 72, link 5 (fourth inflection point link 84) adjacent to fixed-side linear portion 71 is treated as one rigid body, and remaining links 5 are treated as one rigid body. When links 5 that do not belong to fixed-side linear portion 71 exists between fixed-side linear portion 71 and cable guide connection 7, those links 5 are referred to as fixed-side adjacent portions. The fixed-side adjacent portions are treated as one rigid body. In fixed-side linear portion 71, link 5 connected to cable guide connection 7 or link 5 adjacent to link 5 belonging to fixed-side adjacent portion is treated as one rigid body, and remaining links 5 are treated as one rigid body.

The shape of cable guide 4 suspended from movable-side member 2 at each position where movable-side member 2 moves can be calculated in each of the case where link 5 is handled individually or the case where the plurality of links 5 are handled collectively as one rigid body. Before the cable guide and suspending device are fabricated actually, the shape of the cable guide can be checked by simulation. Accordingly, the cable guide and the suspending device suitable for the usage environment can be designed and fabricated.

Suspending device 90 can be used to protect the cables connected between an azimuth pedestal that changes an azimuth angle of a large telescope and an elevation pedestal that is mounted on the azimuth pedestal to change the elevation angle. In that case, the azimuth pedestal is fixed-side member 1 and the elevation pedestal is movable-side member 2. The elevation pedestal rotates and moves such that the elevation angle is changed in the range of 0 degrees to 90 degrees with respect to the azimuth pedestal. Suspending device 90 is installed near the elevation pedestal. When applied to the large telescope, suspending device 90 is effective in the case where the space for installing suspending device 90 is narrow. In suspending device 90, the plurality of (six) narrow cable guides 4 are disposed side by side in the direction parallel to the side surface of the elevation angle pedestal. Accordingly, the azimuth pedestal and the elevation pedestal can be connected by the cable guide equipped with the cables required for driving the large telescope in a narrow space. In the cable guide and the suspending device of the present disclosure, the cables can be disposed in the narrow space with high spatial density even when the device is different from the large telescope.

In the large telescope, friction or vibration is required to be reduced when the elevation angle is changed. In suspending device 90, when movable-side member 2 moves, angle θj of each link $5_j$ is changed slowly and little by little according to the movement. When angle θj of each link $5_j$ is changed slowly and little by little, link 53 does not come into contact with other links 5 and the like. Accordingly, suspending device 90 is moved quietly according to the movement of movable-side member 2, and does not generate the friction or the vibration.

In cable guide 4, a shape taken at each position in which movable-side member 2 moves is a position having second bent portion 74 in which cable guide 4 is bent such that the first surface becomes concave, first bent portion 72 in which cable guide 4 is bent such that the second surface becomes concave, suspending portion 75 that connects movable-side member 2 and second bent portion 74 in the straight line, intermediate linear portion 73 that connects second bent portion 74 and first bent portion 72 in the straight line, and fixed-side linear portion 71 that connects first bent portion 72 and fixed-side member 1 in the straight line. Furthermore, the curvature (curvature radius) at second bent portion 74 and first bent portion 72 is determined such that cable guide 4 on the outside has a small curvature (large curvature radius). For this reason, even when the plurality of cable guides 4 are disposed close to each other, the plurality of cable guides 4 do not come into contact with each other. As illustrated in FIGS. 10 and 11, the length of cable guide 4 is necessary and sufficient such that suspending portion 75 can hang vertically when movable-side member 2 moves to the farthest position from fixed-side member 1.

In the usual cable guide, the movable-side member and the fixed-side member are connected in a catenary. The cable guide hanging in a catenary shape is likely to come into contact with the adjacent cable guide when the movable-side member moves. Even when tension is applied such that the cable guide becomes linear, while the movable-side member is present at the position farthest from the fixed-side member, the shape becomes catenary when the movable-side member comes to the position close to the fixed-side member. When the tension is applied, the tension that is larger than weights of the cable guide including the cable is required to be applied between the movable-side member and the fixed-side member. Accordingly, the cable guide is required to be strong enough to withstand the tension, and the cable guide becomes heavy.

In cable guide 4, suspending portion 75 is suspended vertically from movable-side member 2. Accordingly, the tension greater than the weights of the cable guide and the cable is not applied to cable guide 4. First bent portion 72 and second bent portion 74 are bent with the determined curvature. Accordingly, cable 3 is not bent excessively. Because the maximum absolute value of the curvature at first bent portion 72 and second bent portion 74 is changed in each of cable guide $4_{A1}$, $4_{A2}$, $4_{A3}$, $4_{B1}$, $4_{B2}$, $4_{B3}$, the cables in which the curvature is required to be smaller are attached to cable guide 4 having the smaller maximum absolute value of the curvature, and the cables that can withstand the large curvature are attached to cable guide 4 having the larger maximum absolute value of the curvature. Since the cables are contained in the plurality of cable guides 4 separately, the number of cables contained in one cable guide can be decreased. Accordingly, stress applied to the cables in the cable guide can be reduced.

A dry bearing mechanism in which lubricating oil or the like is not used is used at the place where each link 5 constituting cable guide 4 is connected. Because the bearing mechanism is used, the connection angle of link 5 can be changed smoothly. In addition, maintenance of cable guide 4 is not required.

Each link 5 constituting cable guide 4 includes cushioning material 55 in the surface on the side in which cable guide 4 may come into contact with another cable guide 4. Cushioning material 55 can soften the impact when cable guide 4 comes into contact with another cable guide 4 or the like, and can prevent link 5 and the contacted member from being damaged.

In cable guide 4, links 5 are connected linearly in intermediate linear portion 73 when viewed from the side. Because links 5 are connected linearly in intermediate linear portion 73, even when movable-side member 2 moves, the space is produced between two cable guides 4 disposed close to each other, and cable guide 4 is no contact with another cable guide 4. The shape of intermediate linear portion 73 seen from the side may be a polygonal line instead of the straight line. The curvature at the intermediate linear portion 73 to which links 5 are connected by the straight line or the polygonal line when viewed from the side is determined such that intermediate linear portion 73 has a long-and-short ratio that is greater than or equal to a determined value (referred to as an intermediate minimum long-and-short ratio). The long-and-short ratio that is a value obtained by dividing a long side of a smallest rectangle that surrounds intermediate linear portion 73 when viewed from the side by a short side of the smallest rectangle. For example, the intermediate minimum long-and-short ratio is a value greater than or equal to twenty. Intermediate linear portion 73 may have the curvature in which either first surface 5F or second surface 5R becomes concave as long as the long-and-short ratio is greater than or equal to the intermediate minimum long-and-short ratio. The curvature of intermediate linear portion 73 may not be a constant value, but may be the curvature that is changed within a determined range. The curvature of intermediate linear portion 73 may be determined based on the curvature of first bent portion 72 without using the long-and-short ratio. When determining the curvature based on the curvature (referred to as a curvature 1) of first bent portion 72, for example, the curvature of intermediate linear portion 73 is determined to be less than or equal to 10% of curvature 1. Even when the curvature of intermediate linear portion 73 is determined based on the curvature of first bent portion 72, the long-and-short ratio of the smallest rectangle surrounding intermediate linear portion 73 may be to be greater than or equal to the intermediate minimum long-and-short ratio.

Fixed-side linear portion 71 may also be the straight line or the polygonal line with a determined range of the curvature. The curvature may be determined such that the long-and-short ratio of the smallest rectangle surrounding the part of the plurality of links 5 belonging to fixed-side linear portion 71 is greater than or equal to a determined fixed-side minimum long-and-short ratio. For example, the fixed-side minimum length-short ratio is a value greater than or equal to twenty. The curvature of fixed-side linear portion 71 may not be a constant value, but may be a plurality of curvatures within a determined range. The curvatures at first bent portion 72 and second bent portion 74 may not be a constant value, but may be a curvature within a determined range. For example, the curvature may be changed within a determined range such that first bent portion 72 and second bent portion 74 are bent at an ellipse. In one cable guide 4, the range of curvature may be changed in first bent portion 72 and second bent portion 74. When the bent angle at second bent portion 74 is smaller than the bent angle at first bent portion 72, second bent portion 74 may have the curvature having the larger absolute value than that of first bent portion 72.

Cable guides $4_{A1}$, $4_{B1}$ mounted on bottom surface 1A of fixed-side member 1 extend in the straight line by being supported from below. Fixed-side linear portion 71 is the plurality of links 5 that become the straight lines or the polygonal lines having the determined range of the curvature even when the plurality of links 5 are not supported from below. Accordingly, cable guides $4_{A1}$, $4_{B1}$ may have a shape that does not have fixed-side linear portion 71.

Bottom surface 1A is the support that supports link 5 existing between first bent portion 72 and cable guide connection $7_{A1}$ in cable guide $4_{A1}$ from below. Bottom surface 1A is also the support that supports link 5 existing between first bent portion 72 and cable guide connection $7_{B1}$ in cable guide $4_{B1}$ from below.

In each link 5, the range of connection angle θ of adjacent links 5 is determined to be θM≥θ≥0 or 0≥θ≥−θM. Only the upper limit (first limit value) or the lower limit (second limit value) of the connection angle range may be determined depending on the position of link 5 in all links 5 belonging to cable guide 4.

In each cable guide 4, a part of the plurality of links 5 being disposed consecutively and including link 5 that becomes first bent portion 72 at any position where movable-side member 2 moves are defined as a first link set (also referred to as a first protective frame body set). The first link set is a set including links 5 of kind B, kind C, kind D, and kind E. In link 5 belonging to the first link set, the upper limit (first limit value) of the connection angle range may be determined such that second surface 5R becomes concave at the curvature within the range of the first curvature range that is the range of the determined curvature. The first curvature range may be determined to include only one determined curvature. The first curvature range is determined such that the height difference between first inflection point link 81 and cable guide connection 7 is greater than or equal to the determined first height at each position where movable-side member 2 moves. The height of first inflection point link 81 is the highest in links 5 belonging to first bent portion 72.

In each cable guide 4, the first height is determined such that adjacent cable guide 4 and first bent portion 72 do not come into contact with each other and such that the first height is different from that of adjacent cable guide 4. The first height of cable guides $4_{A1}$, $4_{B1}$ is determined to be larger than the first height of cable guides $4_{A2}$, $4_{B2}$. The first height of cable guides $4_{A2}$, $4_{B2}$ is determined to be larger than the first height of cable guides $4_{A3}$, $4_{B3}$.

Because the first height of cable guides $4_{A1}$, $4_{B1}$ is set larger than the first height of cable guides $4_{A2}$, $4_{B2}$, an absolute value of the first curvature range determined for cable guides $4_{A1}$, $4_{B1}$ is smaller than an absolute value of the first curvature range determined for cable guides $4_{A2}$, $4_{B2}$. Because the first height of cable guides $4_{A2}$, $4_{B2}$ is determined to be larger than the first height of cable guides $4_{A3}$, $4_{B3}$, an absolute value of the first curvature range determined for cable guides $4_{A2}$, $4_{B2}$ is smaller than an absolute value of the first curvature range determined for cable guides $4_{A3}$, $4_{B3}$. Here, an absolute value of the curvature range is a range in which the absolute value of the curvature included in the curvature range exists. When the curvature range does not include zero, the absolute value of the curvature range is the range between the absolute value of one limit value and the absolute value of the other limit value of the curvature range. When the curvature range includes zero, the absolute value of the curvature range is the range between zero and larger one among the absolute value of one limit value of the curvature range and the absolute value of the other limit value of the curvature range. That an absolute value of one curvature range (referred to as an absolute curvature range 1) is smaller than an absolute value of another curvature range (referred to as an absolute curvature range 2) means that the upper limit of absolute curvature range 1 is smaller than the lower limit of absolute curvature range 2.

The first curvature range of two adjacent cable guides 4 and the difference in the height of cable guide connection 7 are determined such that the difference in the height of first inflection point link 81 of two adjacent cable guides 4 is greater than or equal to the determined separation height.

In each cable guide 4, a part of the plurality of links 5 being disposed consecutively and including link 5 that becomes intermediate linear portion 73 at any position where movable-side member 2 moves are defined as a second link set (also referred to as a second protective frame body set). The second link set is a set including links 5 of kind D, kind E, and kind F. In link 5 belonging to the second link set, the lower limit (second limit value) of the connection angle range may be determined such that first surface 5F becomes the straight line or the polygonal line having the curvature within the second curvature range that is the range of the curvature determined such that the long-and-short ratio is greater than or equal to the intermediate minimum long-and-short ratio. In link 5 that does not belong to the first link set but belongs to the second link set, the upper limit (first limit value) of the connection angle range may be any value greater than or equal to the lower limit (second limit value). In link 5 of kind F that is always intermediate linear portion 73, the upper limit (first limit value) of the connection angle range may be set to 0 degrees. In link 5 that belongs to both the first link set and the second link set, the upper limit (first limit value) of the connection angle range is determined such that second surface 5R becomes concave with a curvature within the range of the first curvature range.

In each cable guide 4, a part of the plurality of links 5 being disposed consecutively and including link 5 that becomes fixed-side linear portion 71 at any position where movable-side member 2 moves are defined as a third link set (also referred to as a third protective frame body set). The third link set is a set including link 5 of kind A or kind B. In link 5 belonging to the third link set, the lower limit (second limit value) of the connection angle range may be determined such that first surface 5F becomes the straight line or the polygonal line having the curvature within the third curvature range that is the range of the curvature determined such that the long-and-short ratio is greater than or equal to the intermediate minimum long-and-short ratio. In link 5 that does not belong to the first link set but belongs to the third link set, the upper limit (first limit value) of the connection angle range is arbitrary. In link 5 belonging to both the first link set and the third link set, the upper limit (first limit value) of the connection angle range is determined from the condition to be first bent portion 72.

The third curvature range is determined such that the value obtained by subtracting the height of cable guide connection 7 from the height of lowest point link 85 at each position where movable-side member 2 moves is greater than or equal to the determined decrease allowable value. The decrease allowable value is determined according to the height of cable guide connection 7 of adjacent cable guide 4. By doing so, link 5 does not come into contact with link 5 of adjacent cable guide 4 at fixed-side linear portion 71.

One of the two adjacent cable guides 4 is a first protective frame articulated body, and the other is a second protective frame articulated body. Cable guide 4 that is the second protective frame articulated body is required to have the third link set and to be able to be the shape having fixed-side linear portion 71. Fixed-side connection 7 of cable guide 4 that is the second protective frame articulated body is disposed at the position higher than fixed-side connection 7 of cable guide 4 that is the first protective frame articulated body. The difference between the first curvature range of two adjacent cable guides 4 and the difference in the height of fixed-side connection 7 are determined such that the difference between the height of first inflection point link 71 of cable guide 4 that is the first protective frame articulated body and the height of first inflection point link 71 of cable guide 4 that is the second protective frame articulated body is greater than or equal to the separation height at each position where the movable-side member moves. First inflection point link 71 of cable guide 4 that is the first protective frame articulated body is present at a higher position than first inflection point link 71 of cable guide 4 that is the second protective frame articulated body. The absolute value of the first curvature range determined for cable guide 4 that is the first protective frame articulated body is determined to be smaller than the absolute value of the first curvature range determined for cable guide 4 that is the second protective frame articulated body.

Each cable guide 4 includes kind D link 5 that becomes fixed-side linear portion 71, first bent portion 72, or intermediate linear portion 73 depending on the position of movable-side member 2 that moves. Link 5 of kind D is required to belong to the first link set, the second link set, and the third link set. For this reason, the second curvature range defined by the second link set and the third curvature range defined by the third link set are required to have the same or common portion. And, the intermediate minimum long-and-shirt ratio in intermediate linear portion 73 and the fixed-side minimum long-and-short ratio in fixed-side linear portion 71 are required to be the same value or the similar value. In link 5 of kind D, first surface 5F becomes the straight line or the polygonal line having the curvature included in both the second curvature range and the third curvature range. When link 5 of kind D does not exist, the second curvature range and third curvature range may be determined so that the common portion does not exist.

In cable guide 4, the set of kind 1 links 5 belongs to any of the first link set, the second link set, and the third link set. When the second curvature range and third curvature range do not have the common portion in the cable guide that does not have the link of kind C, angle θM determined for link 5 that belongs to the second link set and angle θM determined for link 5 that belongs to the third link set are required to be different from each other.

A part of the plurality of links 5 being disposed consecutively and including link 5 that becomes second bent portion 74 at any position where movable-side member 2 moves are defined as fourth link set (also referred to as a fourth protective frame body set). The fourth link set is a set including links 5 of kind G or kind H. In link 5 belonging to the fourth link set, the lower limit (second limit value) of the connection angle range may be determined to be the connection angle in which first surface 5F becomes concave with the curvature within the determined fourth curvature range. The fourth curvature range that defines the curvature at second bent portion 74 is determined to be at the same level as the first curvature range that defines the curvature at first bent portion 72. When the first curvature range and the fourth curvature range are set to the same, loads applied to cable 3 by the bending of first bent portion 72 and the bending of second bent portion 74 can be made the same.

The absolute value of the fourth curvature range determined for cable guides $4_{A1}$, $4_{B1}$ is determined to be smaller than the absolute value of the fourth curvature range determined for cable guides $4_{A1}$, $4_{B1}$. The absolute value of the fourth curvature range determined for cable guides $4_{A2}$, $4_{B2}$ is determined to be smaller than the absolute value of the fourth curvature range determined for cable guides $4_{A3}$, $4_{B3}$.

Second bent portion 74 may be one link 5 that can be connected by the polygonal line in which first surface 5F becomes concave. For example, one link 5 that becomes second bent portion 74 can be connected to adjacent link 5 at the connection angle of up to about 45 degrees. The cable guide in which second bent portion 74 is one link 5 contains the cables that can be bent with the large curvature.

In each cable guide 4, the number of suspensions is determined such that the height difference between second inflection point link 82 and guide end connection 8 is greater than or equal to the determined suspension height at each position where movable-side member 2 moves. Here, the number of suspensions is the number of links 5 that do not belong to the second link set that exist between link 5 belonging to the second link set and guide end connection 8. In Embodiment 1, the number of suspensions is the number of type 2 links 5.

The number of suspensions of cable guides $4_{A1}$, $4_{B1}$ is smaller than the number of suspensions of the cable guides $4_{A1}$, $4_{B1}$. The number of suspensions of cable guides $4_{A2}$, $4_{B2}$ is smaller than the number of suspensions of cable guides $4_{A2}$, $4_{B2}$.

In suspending device 90, cable guide $4_{A1}$ is the first protective frame articulated body, and cable guide $4_{A2}$ is the second protective frame articulated body in which first surface 5F of cable guide $4_{A2}$ faces second surface 5R of cable guide $4_{A1}$. Because cable guide $4_{A1}$ is supported by bottom surface 1A from below, cable guide $4_{A1}$ may not have the third link set including link 5 that becomes fixed-side linear portion 71 even when cable guide $4_{A1}$ is not supported from below. Because cable guide $4_{A2}$ includes the third link set, cable guide $4_{A2}$ is the second protective frame articulated body including fixed-side linear portion 71. Alternatively, cable guide $4_{B1}$ is the first protective frame articulated body, and cable guide $4_{B2}$ is the second protective frame articulated body.

Cable guide $4_{A2}$ may be regarded as the first protective frame articulated body and cable guide $4_{A3}$ may be regarded as the second protective frame articulated body. Since cable guides $4_{A2}$, $4_{A3}$ includes third link set, they can be regarded as described above. Cable guide $4_{B2}$ may be regarded as the first protective frame articulated body and cable guide $4_{B3}$ may be regarded as the second protective frame articulated body.

Regarding the number of suspensions, the number of suspensions of cable guide $4_{A1}$ is determined to be smaller than the number of suspensions of cables guide $4_{A2}$ such that the distance between second inflection point link 82 of cable guide $4_{A1}$ and second inflection point link 82 of cable guide $4_{A2}$ is greater than or equal to the determined separation distance. The number of suspensions of cable guide $4_{A2}$ is determined to be smaller than the number of suspensions of cables guide $4_{A3}$ such that the distance between second inflection point link 82 of cable guide $4_{A2}$ and second inflection point link 82 of cable guide $4_{A3}$ is greater than or equal to the determined separation distance.

Similarly, the number of suspensions of cable guide $4_{B1}$ is determined to be smaller than the number of suspensions of cables guide $4_{B2}$ such that the distance between second inflection point link 82 of cable guide $4_{B1}$ and second inflection point link 82 of cable guide $4_{B2}$ is greater than or equal to the determined separation distance. The number of suspensions of cable guide $4_{B2}$ is determined to be smaller than the number of suspensions of cables guide $4_{B3}$ such that the distance between second inflection point link 82 of cable guide $4_{B2}$ and second inflection point link 82 of cable guide $4_{B3}$ is greater than or equal to the determined separation distance.

In suspending device 90, cable guide $4_{A1}$ is the first protective frame articulated body, cable guide $4_{A2}$ is the second protective frame articulated body, cable guide $4_{B1}$ is a third protective frame articulated body, and cable guide $4_{B2}$ is a fourth protective frame articulated body disposed such that first surface 5F faces second surface 5R of cable guide $4_{B1}$ and such that second surface 5R faces the side where second surface 5R of cable guide $4_{A2}$ is present. Cable guide $4_{B2}$ may be regarded as the third protective frame articulated body and cable guide $4_{B3}$ may be regarded as the fourth protective frame articulated body. Alternatively, cable guide $4_{A2}$ may be regarded as the first protective frame articulated body and cable guide $4_{A3}$ may be regarded as the second protective frame articulated body. Alternatively, that cable guide $4_{A2}$ may be regarded as the first protective frame articulated body, cable guide $4_{A3}$ may be regarded as the second protective frame articulated body, cable guide $4_{B2}$ may be regarded as the third protective frame articulated body, and cable guide $4_{B3}$ is the fourth protective frame articulated body. Alternatively, cable guide $4_{B1}$ may be regarded as the first protective frame articulated body, cable guide $4_{B2}$ may be regarded as the second protective frame articulated body, cable guide $4_{A1}$ is the third protective frame articulated body, and cable guide $4_{A2}$ is the fourth protective frame articulated body. The relationship similar to that exists between cable guide 4 that is the first protective frame articulated body and cable guide 4 that is the second protective frame articulated body is required to exist between cable guide 4 that is the third protective frame articulated body and cable guide 4 that is the fourth protective frame articulated body.

The suspending device may suspend the cable guide on only one side. The number of cable guides suspended on one side or both sides may be two or at least four. When the suspending device suspends the cable guides on both sides, the number of suspensions of cable guides may be changed on the left and right. When the suspending device suspends the same number of cable guides, the suspending device can be made more compact by suspending the cable guide on both sides rather than suspending cable guide only on one side. For example, when four cable guides are suspended on one side, the curvature at the first bent portion included in the outermost cable guide is required to be small (the curvature radius is large), and the length and height of the suspending device are likely to be larger than those of the case in which two cable guides are suspended on each side.

A modification of the embodiment and omission of the component can be performed in the present disclosure.

REFERENCE SIGNS LIST

90: suspending device,
1: fixed-side member,
1A: bottom surface (support),
1B: front plate,
1C: rear plate,
1D: central support,
$1E_A$, $1E_B$: cable introduction hole,
2: movable-side member,
3, $3_{A1}$, $3_{A2}$, $A3_3$, $3_{B1}$, $3_{B2}$, $3_{B3}$: cable (body to be protected),
4, $4_{A1}$, $4_{A2}$, $4_{A3}$, $4_{B1}$, $4_{B2}$, $4_{B3}$: cable guide (protective frame articulated body),
5: link (protective frame body, protective frame body portion),
5F: first surface,
5R: second surface,
$6_{A1}$, $6_{A2}$, $6_{A3}$, $6_{B1}$, $6_{B2}$, $6_{B3}$: cable guide mounting portion,
$7_{A1}$, $7_{A2}$, $7_{A3}$, $7_{B1}$, $7_{B2}$, $7_{B3}$: cable guide connection (fixed-side connection),
8: guide end connection,
9: structure fixing portion,
10: cable introducing portion,
11: movable-side structure,
$12_{A1}$, $12_{A2}$, $12_{A3}$, $12_{B1}$, $12_{B2}$, $12_{B3}$: front suspending plate (movable-side connection, connecting member),
$13_{A1}$, $13_{A2}$, $13_{A3}$, $13_{B1}$, $13_{B2}$, $13_{B3}$: back suspending plate (movable-side connection, connecting member),
14: front suspending plate holder,
14A: fixed plate,
14B: support frame,
15: front coupling plate (coupling member),
16: back coupling plate (coupling member),
17: base,
18: support frame,
51: first side plate,
52: second side plate,
53: first surface portion,
54: second surface portion,
55: cushioning material,
56: first coupling portion (connection),
57: second coupling portion (connection),
58: bolt,
51A: through-hole,
51B: through-hole,
51C: first side plate first end,
51D: first side plate central portion,
51E: first side plate second end,
51F: first contact surface (connection angle limiter),
51FA: first inclined contact surface (connection angle limiter),
51FB: first parallel contact surface (connection angle limiter),
51G: second contact surface (connection angle limiter),
51H: through-hole,
51J: counter sinking,
51K: counter sinking,
52A: through-hole,
52B: through-hole,
52C: second side plate first end,
52D: second side plate central portion,
52E: second side plate second end,
52F: first contact surface (connection angle limiter),
52FA: first inclined contact surface (connection angle limiter),
52FB: first parallel contact surface (connection angle limiter),
52G: second contact surface (connection angle limiter),
52H: through-hole,
52J: counter sinking,
52K: counter sinking,
61: inner shaft member,
62: inner washer,
63: ring bearing,
64: outer washer,
65: outer shaft member,
66: bolt,
$70_{A1}$, $70_{A2}$, $70_{A1}$, $70_{B1}$, $70_{B2}$, $70_{B3}$: boundary line,
71: fixed-side linear portion,
72: first bent portion,
73: intermediate linear portion,
74: second bent portion,
75: suspending portion,
81: first inflection point link (first inflection point frame body), 82: second inflection point link (second inflection point frame body),
83: third inflection point link (third inflection point frame body),
84: fourth inflection point link (fourth inflection point frame body),
85: lowest point link (lowest point frame body)

The invention claimed is:

1. A protective frame articulated body comprising:
a protective frame body portion including a plurality of protective frame bodies connected in series, through which a body to be protected, being a bendable cable or tube, is able to be passed, each of the plurality of protective frame bodies having a determined length in an extending direction in which the body to be protected extends, and including:
  a connection portion connected to an adjacent protective frame body included in the plurality of protective frame bodies, the adjacent protective frame body being another protective frame body included in the plurality of protective frame bodies, and
  a connection angle limiter limiting a connection angle with the adjacent protective frame body in the connection portion within a determined connection angle range;
a fixed-side connection to connect a first end of the protective frame body portion to a fixed-side member; and
a movable-side connection to connect a second end of the protective frame body portion rotatably to a movable-side member that is able to move relative to the fixed-side member above the fixed-side member and suspends the protective frame body portion, wherein
the protective frame body portion includes:
  a first surface, and
  a second surface, the first and second surfaces being concave or convex based on the connection angle,
the connection angle range of each of the plurality of protective frame bodies is such that:
  the protective frame body portion becomes a first shape with a first bent portion including a part of the plurality of protective frame bodies connected while the second surface is bent to be concave,
  an intermediate linear portion including a part of the plurality of protective frame bodies connected in a straight line or a polygonal line when viewed from a side in a portion closer to the movable-side connection than the first bent portion, the intermediate linear portion having a long-and-short ratio greater than or equal to a determined intermediate minimum long-and-short ratio, the long-and-short ratio being a value obtained by dividing a long side of a smallest rectangle surrounding the intermediate linear portion viewed from the side by a short side of the smallest rectangle,
  a suspending portion including a part of the plurality of protective frame bodies hanging downward from the movable-side connection, and
  a second bent portion including a part of the plurality of protective frame bodies connecting the intermediate linear portion and the suspending portion while the first surface is bent to be concave, and
in each position where the movable-side member is able to move, each of the plurality of protective frame bodies does not contact any other protective frame bodies included in the plurality of protective frame bodies except for the adjacent protective frame body connected thereto at the connection portion.

2. The protective frame articulated body according to claim 1, wherein
the connection angle range of each of the plurality of protective frame bodies is such that the protective frame body portion becomes a second shape with the first bent portion, the intermediate linear portion, the second bent portion, the suspending portion, and also a fixed-side linear portion including a part of the plurality of protective frame bodies connected in a straight line or a polygonal line in a portion closer to the fixed-side connection than the first bent portion, and having the long-and-short ratio of the smallest rectangle surrounding the fixed-side linear portion greater than or equal to a fixed-side minimum long-and-short ratio.

3. The protective frame articulated body according to claim 1, wherein
the protective frame body portion includes a first protective frame body set and a second protective frame body set,
the first protective frame body set is defined as a part of the plurality of protective frame bodies disposed consecutively and including:
  a protective frame body included in the plurality of protective frame bodies, becoming the first bent portion at any position where the movable-side member is able to move, and having a first limit value included in two limit values defining the connection angle range and determining a maximum value of an absolute value of curvature at which the second surface is concave, the first limit value being such that the second surface is concave at curvature within a first curvature range where curvature thereof is defined such that a positive value is taken when the first surface is one of concave and convex and such that a negative value is taken when the first surface is the other one of concave and convex, and
the second protective frame body set is defined as a part of the plurality of protective frame bodies disposed consecutively and including:
  a protective frame body included in the plurality of protective frame bodies, becoming the intermediate linear portion at any position where the movable-side member is able to move, and having a second limit value included in the two limit values defining the connection angle range, the second limit value being such that the first surface becomes a straight line or a polygonal line having curvature within a second curvature range, the second curvature range being a range of curvature such that the long-and-short ratio is greater than or equal to the intermediate minimum long-and-short ratio.

4. The protective frame articulated body according to claim 3, wherein
the connection angle range of each of the plurality of protective frame bodies is such that the protective frame body portion becomes a second shape with the first bent portion, the intermediate linear portion, the second bent portion, the suspending portion, and a fixed-side linear portion and including:
  a part of the plurality of protective frame bodies connected in a straight line or a polygonal line in a portion closer to the fixed-side connection than the first bent portion, and having the long-and-short ratio of the smallest rectangle surrounding the fixed-side linear portion greater than or equal to a fixed-side minimum long-and-short ratio, the protective frame body portion includes a third protective frame body set defined as a part of the plurality of protective frame bodies disposed consecutively and including:

a protective frame body included in the plurality of protective frame bodies, becoming the fixed-side linear portion at any position where the movable-side member is able to move, and having the second limit value being such that the first surface becomes the straight line or the polygonal line having curvature within a third curvature range, the third curvature range being a range of curvature such that the long-and-short ratio is greater than or equal to the fixed-side minimum long-and-short ratio.

5. The protective frame articulated body according to claim 3, wherein the protective frame body portion includes a fourth protective frame body set defined as a part of the plurality of protective frame bodies disposed consecutively and including:

a protective frame body included in the plurality of protective frame bodies, becoming the second bent portion at any position where the movable-side member is able to move, and having the second limit value being such that the first surface becomes concave in curvature within a fourth curvature range being a determined curvature range.

6. The protective frame articulated body according to claim 3, wherein the second bent portion includes a single protective frame body included in the plurality of protective frame bodies.

7. The protective frame articulated body according to claim 3, wherein the first curvature range is such that a height difference between a first inflection point frame body and the fixed-side connection is greater than or equal to a determined first height at each position where the movable-side member is able to move, the first inflection point frame body being a protective frame body included in the plurality of protective frame bodies, belonging to the first bent portion, and being adjacent to the intermediate linear portion.

8. The protective frame articulated body according to claim 3, wherein a number of suspensions is such that a height difference between a second inflection point frame body and the movable-side connection is greater than or equal to a determined suspending height at each position where the movable-side member is able to move, the number of suspensions being a number of protective frame bodies not belonging to the second protective frame body set and existing between a protective frame body belonging to the second protective frame body set and the movable-side connection, the second inflection point frame body being a protective frame body included in the plurality of protective flame: bodies, belonging to the second bent portion, and being adjacent to the suspending portion.

9. A suspending device comprising:

a first protective frame articulated body in the form of the protective frame articulated body according to claim 3;

a second protective frame articulated body in the form of the protective frame articulated body according to claim 3, the second protective frame articulated body being disposed such that the first surface thereof faces the second surface of the first protective frame articulated body;

the fixed-side member; and the movable-side member to suspend the first protective frame articulated body, and the second protective frame articulated body, wherein the connection angle range of each of the plurality of protective frame bodies included in the second protective frame articulated body is such that the protective frame body portion becomes a second shape with the first bent portion, the intermediate linear portion, the second bent portion, the suspending portion, and a fixed-side linear portion and including:

a part of the plurality of protective frame bodies connected in a straight line or a polygonal line in a portion closer to the fixed-side connection than the first bent portion, and having the long-and-short ratio of the smallest rectangle surrounding the fixed-side linear portion greater than or equal to a fixed-side minimum long-and-short ratio, the protective frame body portion included in the second protective frame articulated body includes a third protective frame body set defined as a part of the plurality of protective frame bodies disposed consecutively and including:

a protective frame body included in the plurality of protective frame bodies, becoming the fixed-side linear portion at any position where the movable-side member is able to move, and having the second limit value being such that the first surface becomes the straight line or the polygonal line having curvature within a third curvature range, the third curvature range being a range of curvature such that the long-and-short ratio is greater than or equal to the fixed-side minimum long-and-short ratio, the fixed-side connection included in the second protective frame articulated body is disposed at a position higher than the fixed-side connection included in the first protective frame articulated body while having a determined interval with the fixed-side connection included in the first protective frame articulated body, the movable-side connection included in the first protective frame articulated body and the movable-side connection included in the second protective frame articulated body are disposed with a second determined interval, an absolute value of the first curvature range for the first protective frame articulated body is smaller than an absolute value of the first curvature range for the second protective frame articulated body, and a height difference between the fixed-side connection included in the first protective frame articulated body and the fixed-side connection included in the second protective frame articulated body, the first curvature range of the first protective frame articulated body, and the first curvature range of the second protective frame articulated body are such that a height difference between a first inflection point frame body included in the first protective frame articulated body and the first inflection point frame body included in the second protective frame articulated body is greater than or equal to a determined separation height at each position where the movable-side member is able to move, the first inflection point frame body being a protective frame body included in the plurality of protective frame bodies, belonging to the first bent portion, and being adjacent to the intermediate linear portion.

10. The suspending device according to claim 9, wherein the protective frame body portion included in each of the first protective frame articulated body and the second protective frame articulated body includes a fourth protective frame body set defining a part of the plurality of protective frame bodies disposed consecutively and including a protective frame body included in the plurality of protective frame bodies, becoming the second bent portion at any position where the movable-side member is able to move, and having the second limit value being such that the first surface becomes concave in curvature in a fourth curvature range being a determined curvature range, and an absolute value of the fourth curvature range for the first protective frame articulated body is smaller than an absolute value of the fourth curvature range for the second protective frame articulated body.

11. The suspending device according to claim 9, wherein a number of suspensions in the first protective frame articulated body is smaller than a number of suspensions in the second protective frame articulated body such that a distance between a second inflection point frame body included in the first protective frame articulated body and a second inflection point frame body included in the second protective frame articulated body is greater than or equal to a determined separation distance at each position where the movable-side member is able to move, the number of suspensions being a number of protective frame bodies not belonging to the second protective frame body set and existing between any of the protective frame bodies belonging to the second protective frame body set and the movable-side member, the second inflection point frame body being a protective frame body included in the plurality of protective frame bodies, belonging to the second bent portion, and being adjacent to the suspending portion.

12. The suspending device according to claim 9, wherein in the second protective frame articulated body, the third curvature range is such that a value obtained by subtracting the height of the fixed-side connection from the height of a lowest point frame body is greater than or equal to a determined decrease allowable value at each position where the movable-side member is able to move, the lowest point frame body being a protective frame body included in the plurality of protective frame bodies, and present at the lowest position of the protective frame bodies belonging to the fixed-side linear portion.

13. The suspending device according to claim 9, further comprising a support included in the first protective frame articulated body, the support supporting a protective frame body included in the plurality of protective frame bodies present between the first bent portion and the fixed-side connection from below.

14. The suspending device according to claim 9, wherein
the first protective frame articulated body is in the form of the protective frame articulated bod according to claim 4, and in each of the first protective frame articulated body and the second protective frame articulated body, a value obtained by subtracting the height of the fixed-side connection from the height of a lowest point frame body is greater than or equal to a determined decrease allowable value at each position where the movable-side member is able to move, the lowest point frame body being a protective frame body included in the plurality of protective frame bodies, and present at the lowest position of the protective frame bodies belonging to the fixed-side linear portion.

15. The suspending device according to claim 9, wherein a number of the plurality of protective frame bodies included in each of the first protective frame articulated body and the second protective frame articulated body is such that the suspending portion included in each of the first protective frame articulated body and the second protective frame articulated body hangs vertically at each position where the movable-side member is able to move and such that a horizontal distance between the first inflection point frame body included in the first protective frame articulated body and the first inflection point frame body included in the second protective frame articulated body is greater than or equal to a determined horizontal separation distance.

16. The suspending device according to claim 9, wherein the movable-side connection includes two opposing connecting members in which a first end of each of the two opposing connecting members is connected to each of two side surfaces rotatably, sandwiching the first surface and the second surface, of a protective frame body present at the second end of the protective frame body portion while a second end a each of the two opposing connecting members is connected to the movable-side member rotatably.

17. The suspending device according to claim 16, further comprising two coupling members each of which couples each of the two opposing connecting members included in the first protective frame articulated body and the second protective frame articulated body.

18. The suspending device according to claim 9, further comprising:
a third protective frame articulated body in the form of the protective frame articulated body according to claim 3; and
a fourth protective frame articulated body in the form of the protective frame articulated body according to claim 3, the fourth protective frame articulated body being disposed such that the first surface thereof faces the second surface of the third protective frame articulated body, and that the second surface thereof faces a side in which the second surface of the second protective frame articulated body is present, wherein
the connection angle range of each of the plurality of protective frame bodies included in the fourth protective frame articulated body is such that the protective frame body portion becomes a second shape with the first bent portion, the intermediate linear portion, the second bent portion, the suspending portion, and a fixed-side linear portion and including:
a part of the plurality of protective frame bodies connected in a straight line or a polygonal line in a portion closer to the fixed-side connection than the first bent portion, and having the long-and-short ratio of the smallest rectangle surrounding the fixed-side linear portion greater than or equal to a fixed-side minimum long-and-short ratio,
the protective frame body portion included in the fourth protective frame articulated body includes a third protective frame body set defined as a part of the plurality of protective frame bodies disposed consecutively and including:
a protective frame body included in the plurality of protective frame bodies, becoming the fixed-side linear portion at any position where the movable-side member is able to move, and having the second limit value being such that the first surface becomes the straight line or the polygonal line having curvature within a third curvature range, the third curvature range being a range of curvature such that the long-and-short ratio is greater than or equal to the fixed-side minimum long-and-short ratio, the movable-side member suspends the third protective frame articulated body and the fourth protective frame articulated body, the fixed-side connection included in the fourth protective frame articulated body is disposed at a position higher than the fixed-side connection included in the third protective frame articulated body while having a determined interval with the fixed-side connection included in the third protective frame articulated body, the movable-side connection included in the fourth protective frame articulated body is disposed with a determined interval with the movable-side connection included in each of the second protective frame articulated body and the third protective frame articulated body, an absolute value of the first curvature range for the third protective frame articulated body is smaller than an absolute value of the first curvature range for the fourth protective frame articulated body, and a height difference between the fixed-side connection included in the third protective frame articulated body and the fixed-side connection included in the fourth protective frame articulated body, the first curvature range of the third protective frame articulated body, and the first curvature range of the fourth protective frame articulated body are such that a height difference between the first inflection point frame body included in the third protective frame articulated body and the first inflection point frame body included in the fourth protective frame articulated body is greater than or equal to a determined separation height at each position where the movable-side member is able to move.

19. The suspending device according to claim 18, wherein the protective frame body portion included in each of the first protective frame articulated body, the second protective frame articulated body, the third protective frame articulated body, and the fourth protective frame articulated body includes a fourth protective frame body set defining a part of the plurality of protective frame bodies disposed consecutively and including a protective frame body included in the plurality of protective frame bodies, becoming the second bent portion at any position where the movable-side member is able to move, and having the second limit value being such that the first surface becomes concave in curvature in a fourth curvature range being a determined curvature range, an absolute value of the fourth curvature range for the first protective frame articulated body is smaller than an absolute value of the fourth curvature range for the second protective frame articulated body, and an absolute value of the fourth curvature range for the third protective frame articulated body is smaller than an absolute value of the fourth curvature range for the fourth protective frame articulated body.

20. The suspending device according to claim 18, wherein a number of suspensions in the first protective frame articulated body is smaller than a number of suspensions in the second protective frame articulated body such that a distance between a second inflection point frame body included in the first protective frame articulated body and the second inflection point frame body included in the second protective frame articulated body is greater than or equal to a determined separation distance at each position where the movable-side member is able to move, the number of suspensions being a number of protective frame bodies not belonging to the second protective frame body set and existing between any of the protective frame bodies belonging to the second protective frame body set and the movable-side connection, the second inflection point frame body being a protective frame body included in the plurality of protective frame bodies, belonging to the second bent portion, and being adjacent to the suspending portion, and the number of suspensions in the third protective frame articulated body is smaller than the number of suspensions in the fourth protective frame articulated body such that a distance between the second inflection point frame body included in the third protective frame articulated body and the second inflection point frame body included in the fourth protective frame articulated body is greater than or equal to the separation distance at each position where the movable-side member is able to move.

21. The suspending device according to claim 18, wherein in each of the second protective frame articulated body and the fourth protective frame articulated body, a value obtained by subtracting the height of the fixed-side connection from the height of a lowest point frame body is greater than or equal to a determined decrease allowable value at each position where the movable-side member is able to move, the lowest point frame body being a protective frame body included in the plurality of protective frame bodies, and present at the lowest position of the protective frame bodies belonging to the fixed-side linear portion.

22. The suspending device according to claim 18, further comprising a support included in each of the first protective frame articulated body and the third protective frame articulated body, the support supporting a protective frame body included in the plurality of protective frame bodies existing between the first bent portion and the fixed-side connection from below.

23. The suspending device according to claim 18, wherein the connection angle range of each of the plurality of protective frame bodies included in each of the first protective frame articulated body and the third protective frame articulated body is such that the protective frame body portion becomes a second shape with the first bent portion, the intermediate linear portion, the second bent portion, the suspending portion, and a fixed-side linear portion and including:
  a part of the plurality of protective frame bodies connected in a straight line or a polygonal line in a portion closer to the fixed-side connection than the first bent portion, and having the long-and-short ratio of the smallest rectangle surrounding the fixed-side linear portion greater than or equal to a fixed-side minimum long-and-short ratio,
the protective frame body portion included in each of the first protective frame articulated body and the third protective frame articulated body includes a third protective frame body set defined as a part of the plurality of protective frame bodies disposed consecutively and including:
  a protective frame body included in the plurality of protective frame bodies, becoming the fixed-side linear portion at any position where the movable-side member is able to move, and having the second limit value being such that the first surface becomes the straight line or the polygonal line having curvature within a third curvature range, the third curvature range being a range of curvature such that the long-and-short ratio is greater than or equal to the fixed-side minimum long-and-short ratio, and in each of the first protective frame articulated body, the second protective frame articulated body, the third protective frame articulated body, and the fourth protective frame articulated body, a value obtained by subtracting the height of the fixed-side connection from the height of a lowest point frame body is greater than or equal to a determined decrease allowable value at each position where the movable-side member is able to move, the lowest point frame body being a protective frame body included in the plurality of protective frame bodies, and present at the lowest position of the protective frame bodies belonging to the fixed-side linear portion.

24. The suspending device according to claim 18, wherein a number of the plurality of protective frame bodies included in each of the first protective frame articulated body and the second protective frame articulated body is such that the suspending; portion included in each of the first protective frame articulated body and the second protective frame articulated body hangs vertically and such that a horizontal distance between the first inflection point frame body included in the first protective frame articulated body and the first inflection point frame body included in the second protective frame articulated body is greater than or equal to a determined horizontal separation distance at each position where the movable-side member is able to move, and a number of the plurality of protective frame bodies included in each of the third protective frame articulated body and the fourth protective frame articulated body is such that the suspending portion included in each of the third protective frame articulated body and the fourth protective frame articulated body hangs vertically and such that a horizontal distance between the first inflection point frame body included in the third protective frame articulated body and the first inflection point frame body included in the fourth protective frame articulated body is greater than or equal to the horizontal separation distance.

25. The suspending device according to claim 18, wherein the movable-side connection includes two opposing connecting members in which a first end of each of the two opposing connecting members is connected to each of two side surfaces rotatably, sandwiching the first surface and the second surface, of a protective frame body present at the second end of the protective frame body portion while a second end of each of the two opposing connecting members is connected to the movable-side member rotatably.

26. The suspending device according to claim 25, further comprising two coupling members each of which couples each of the two opposing connecting members included in the first protective frame articulated body, the second protective frame articulated body, the third protective frame articulated body, and the fourth protective frame articulated body.

27. The protective frame articulated body according to claim 1, wherein a number of the plurality of protective frame bodies is such that the suspending portion hangs vertically at each position where the movable-side member is able to move.

28. The protective frame articulated body according to claim 1, wherein the movable-side connection includes two opposing connecting members in which a first end of each of the two opposing connecting members is connected to each of two side surfaces rotatably, sandwiching the first surface and the second surface, of a protective frame body present at the second end of the protective frame body portion while a second end of each of the two opposing connecting members is connected to the movable-side member rotatably.

* * * * *